United States Patent
Ganesan et al.

(10) Patent No.: US 12,212,557 B2
(45) Date of Patent: Jan. 28, 2025

(54) NETWORKING DEVICE CREDENTIAL INFORMATION RESET SYSTEM

(71) Applicant: Dell Products L.P., Round Rock, TX (US)

(72) Inventors: Senthil Kumar Ganesan, San Ramon, CA (US); Venkatesan Mahalingam, Pleasanton, CA (US); Vinoth Kumar Arumugam, Fremont, CA (US)

(73) Assignee: Dell Products L.P., Round Rock, TX (US)

(*) Notice: Subject to any disclaimer, the term of this patent is extended or adjusted under 35 U.S.C. 154(b) by 255 days.

(21) Appl. No.: 17/863,487

(22) Filed: Jul. 13, 2022

(65) Prior Publication Data
US 2024/0022558 A1    Jan. 18, 2024

(51) Int. Cl.
*H04L 9/40* (2022.01)

(52) U.S. Cl.
CPC ........ *H04L 63/083* (2013.01); *H04L 63/0876* (2013.01)

(58) Field of Classification Search
CPC ................. H04L 63/083; H04L 63/0876
See application file for complete search history.

(56) References Cited

U.S. PATENT DOCUMENTS

| 8,078,881 B1* | 12/2011 | Liu ............. H04L 9/3226 713/183 |
| 9,288,202 B1* | 3/2016 | Felton ........... H04L 63/083 |
| 2011/0107400 A1* | 5/2011 | Shankaranarayanan ........ H04L 63/102 726/4 |
| 2013/0198824 A1* | 8/2013 | Hitchcock ....... H04L 63/102 726/5 |
| 2022/0182397 A1* | 6/2022 | Romero Zambrano .......... H04L 63/1416 |

* cited by examiner

*Primary Examiner* — William S Powers
(74) *Attorney, Agent, or Firm* — Joseph Mencher

(57) ABSTRACT

A networking device credential information reset system includes credential information reset authorization devices coupled to a networking device. At least one of the credential information reset authorization devices receives a networking device credential information reset request from the networking device and, in response, generates a networking device credential information reset alert and provides it for display on an administrator device. Following the networking device credential information reset alert being provided for display on the administrator device, a first credential information reset authorization device receives first credential information for the first credential information reset authorization device from the administrator device, validates the first credential information and, in response, provides a credential information reset authorization to the networking device that is configured to cause the networking device to reset second credential information for the networking device.

20 Claims, 17 Drawing Sheets

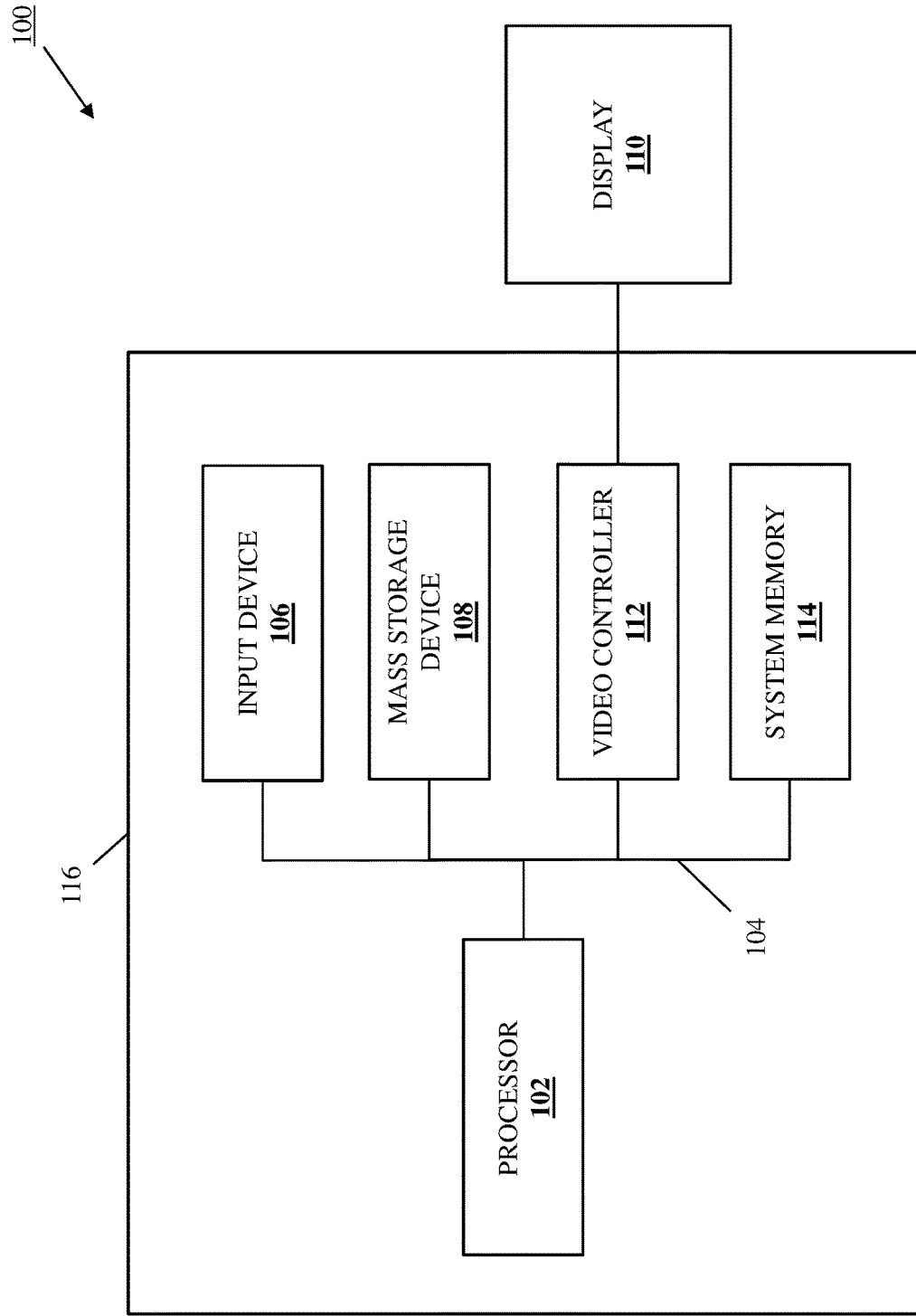

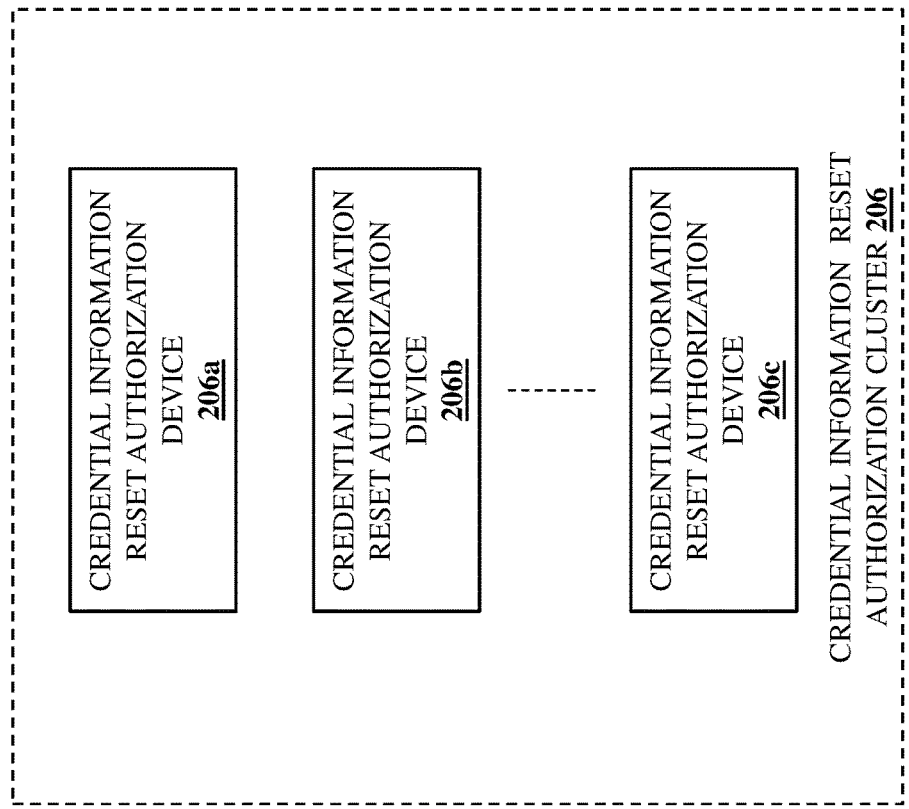

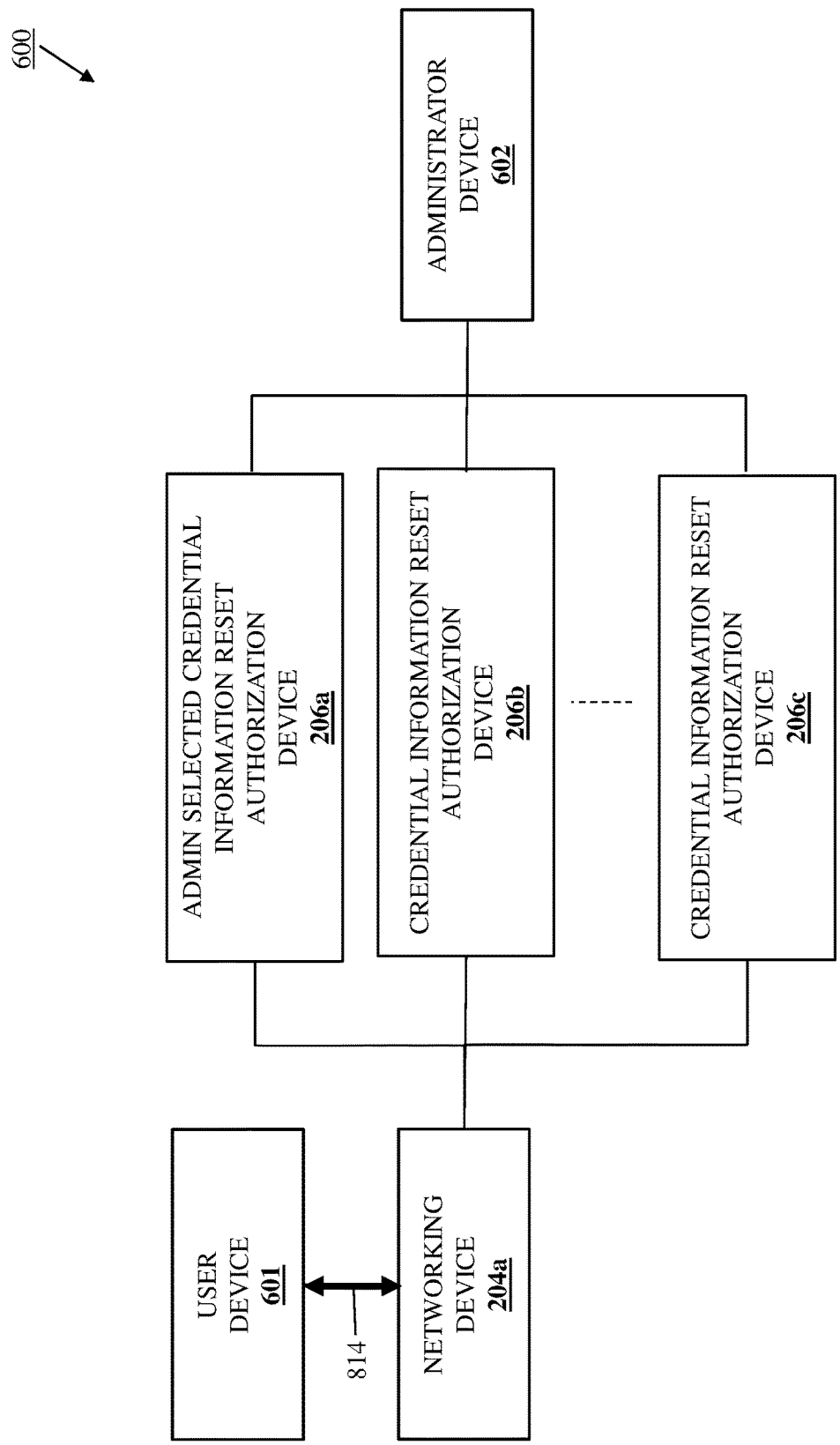

NETWORKING DEVICE CREDENTIAL INFORMATION RESET SYSTEM

BACKGROUND

The present disclosure relates generally to information handling systems, and more particularly to resetting credential information in networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices including switch devices, router devices, and/or other networking devices known in the art, are often secured from unauthorized access via the use of credential information such as passwords associated with user identifiers (e.g., usernames). However, situations may arise in which the credential information for the networking device may need to be reset, which raises issues in conventional networking devices.

For example, a user of a networking device may forget or otherwise "lose" their user password to a switch device, and thus may require that user password to be reset. In the event an administrator password for that switch device is available, a network administrator may utilize that administrator password to authorize a reset of the user password. However, in the event the administrator password for that switch device is unavailable, the resetting of the user password becomes relatively difficult. For example, one option to reset the user password in such a scenario is to reinstall the operating system on the switch device so that a new user password may be selected, which one of skill in the art will recognize requires reconfiguration of the switch device that results in network downtime for the switch device. Another option is reset the password in such a scenario involves the use of "backdoor" mechanisms to obtain access to the user password in order to reset it (e.g., by accessing the bootloader to mount the operating system partition, locating the password file, and resetting the password with a saved password key). However, while such options eliminate the need to reconfigure the switch device, they again result in network downtime and are associated with a relatively higher level of preparation and complexity (e.g., the need to save a secret hashed key from the password file).

Other option to reset a user password on a switch device includes the sending of a user password reset code to a mobile phone of a user so that the user may provide that user password reset code to that switch device to authorize a user password reset, or the storage in the switch device of user "secrets" previously provided by a user (e.g., a city in which the user was born, a name of a first pet of the user, etc.) that may then be provided by that user to the switch device in order to authorize a user password reset. However, many datacenters in which the switch devices discussed above are provided do not allow those switch devices to be coupled to the Internet (e.g., for security reasons), and thus prevent the authorization of a user password reset via mobile phone/user password reset code techniques discussed above, while large datacenters may include a number of users that presents a storage burden for the user "secret" user password reset techniques discussed above.

Accordingly, it would be desirable to provide a networking device credential information reset system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a credential information reset authorization engine that is configured to: receive, from a first networking device, a networking device credential information reset request; generate, in response to receiving the networking device credential information reset request, a networking device credential information reset alert; provide, for display on an administrator device, the networking device credential information reset alert; receive, from the administrator device following the networking device credential information reset alert being provided for display on the administrator device, first credential information for the first credential information reset authorization device; validate the first credential information; and provide, in response to validating the first credential information, a credential information reset authorization to the first networking device that is configured to cause the first networking device to reset second credential information for the first networking device.

BRIEF DESCRIPTION OF THE DRAWINGS

FIG. 1 is a schematic view illustrating an embodiment of an Information Handling System (IHS).

FIG. 2B is a schematic view illustrating an embodiment of a password reset authorization cluster that may be included in the networked system of FIG. 2A.

FIG. 8H is a schematic view illustrating an embodiment of the networking device credential information reset system of FIG. 6 operating during the method of FIG. 5.

DETAILED DESCRIPTION

Figure 2A:
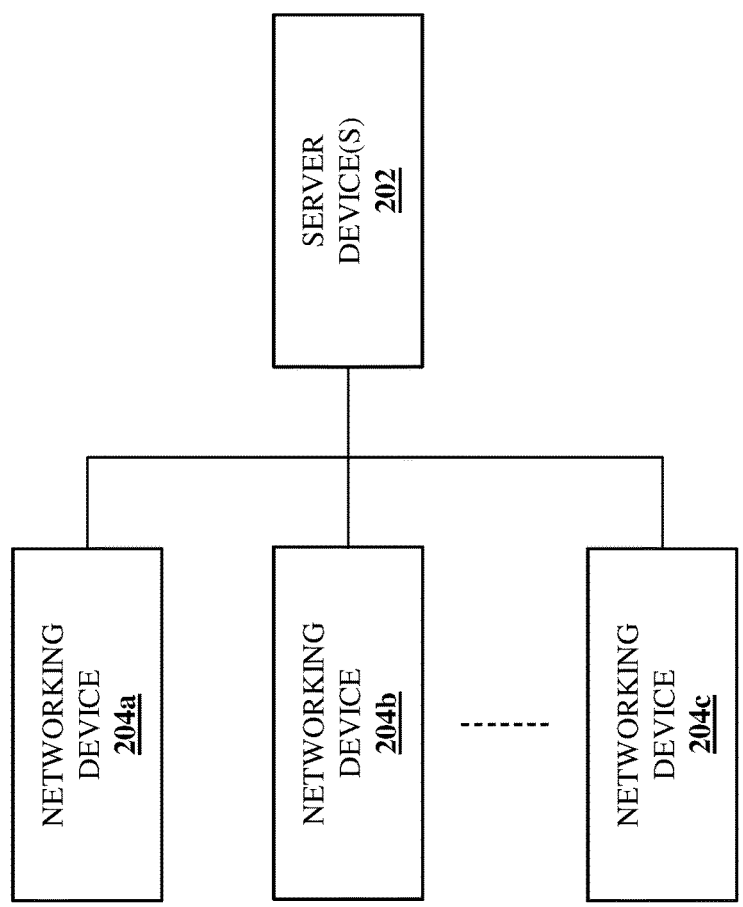
FIG. 2A is a schematic view illustrating an embodiment of a networked system that may include the networking device credential information reset system of the present disclosure.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2A, an embodiment of a networked system 200 is illustrated that may include the networking device credential information reset system of the present disclosure. In the illustrated embodiment, the networked system 200 includes a one or more server devices 202. In an embodiment, the server device(s) 202 may be provided by the IHS 100 discussed above with reference to FIG. 1, and/or may include some or all of the components of the IHS 100. However, while illustrated and discussed as being provided by server devices, one of skill in the art in possession of the present disclosure will recognize that networking device(s) provided in the networked system 200 may be coupled to a variety of other devices (e.g., storage systems, etc.) that may operate similarly as the server device(s) 202 discussed below while remaining within the scope of the present disclosure as well.

In the illustrated embodiment, the networked system 200 also include a plurality of networking devices 204a, 204b, and up to 204c that are coupled to the server device(s) 202. In an embodiment, each of the networking device(s) 204a-204c may be provided by the IHS 100 discussed above with reference to FIG. 1, and/or may include some or all of the components of the IHS 100, and in the specific examples below are described as being provided by switch devices. However, while illustrated and discussed as being provided by switch devices, one of skill in the art in possession of the present disclosure will recognize that networking device(s) provided in the networked system 200 may include any devices that may be configured to operate similarly as the networking device(s) 204a-204c discussed below. As discussed below, in some embodiments the networking devices 204a-204c and the server device(s) 202 may be provided in a datacenter may not provide connections for some or all of the networking devices 204a-204c and/or server device(s) 202 to the Internet, which one of skill in the art in possession of the present disclosure will appreciate may be done for security reasons, due to a lack of an available Internet connection, and/or for a variety of other reasons known in the art. Furthermore, one of skill in the art in possession of the present disclosure will appreciate how, in some examples, each of the networking devices 204a-204c may include different user credential information for different users and different administrator credential information for different administrators. As such, in some examples, each user may have different credential information (e.g., a username/password combination) for each networking device 204a-204c, and each administrator may have different credential information for each networking device 204a-204c.

With reference to FIG. 2B, an embodiment of a credential information reset authorization cluster 206 is illustrated that may be included in the networked system 200 of FIG. 2A. In the illustrated embodiment, the credential information reset authorization cluster 206 includes a plurality of credential information reset authorization devices 206a, 206b, and up to 206c. In an embodiment, each of the credential information reset authorization devices 206a-206c may be provided by the IHS 100 discussed above with reference to FIG. 1, and/or may include some or all of the components of the IHS 100, and in the specific examples below are described as being provided by switch devices (e.g., leaf switch devices in a datacenter). For example, one of skill in the art in possession of the present disclosure will appreciate how any or all of the credential information reset authorization devices 206a-206c may be provided by any of the networking devices 204a-204c. However, while illustrated and discussed as being provided by the networking devices 204a-204c, one of skill in the art in possession of the present disclosure will recognize that credential information reset authorization devices provided in the networked system 200 may include other devices or subsystems that may be configured to operate similarly as the credential information reset authorization devices 206a-206c discussed below. For example, the credential information reset authorization devices 206a-206c may be provided by controller subsystems in the networking devices 204a-204c or server device(s) 202, applications in the networking devices 204a-204c or server device(s) 202, and/or any other hardware and/or software subsystem in the networked system 200 that is configured to perform the functionality of the credential information reset authorization devices 206a-206c discussed below.

As illustrated, in some embodiments, the credential information reset authorization cluster 206 may be configured as a "trusted" domain that includes the credential information reset authorization devices 206a-206c that provide a group of trusted nodes (e.g., trusted networking devices such as the switch devices discussed above) that, as described below, are configured to manage credential information reset requests from any particular networking device. For example, the credential information reset authorization cluster 206 may have been configured as a "trusted" domain via each of the credential information reset authorization devices 206a-206c storing and sharing a 'secret' or other secured data that operates to ensure each of those credential information reset authorization devices that they can trust communications received by another of the credential information reset authorization devices via a variety of trusted domain techniques that would be apparent to one of skill in the art in possession of the present disclosure. To provide a specific example, trusted domain configuration may be accomplished via the following pseudocode:
    #Configure Terminal
    Config#trust-domain <domain-name>
    Config-trust-<domain-name>#client nodes, list of IP/IPv6/FQDN>
    Config-trust-<domain-name>#authorized-nodes <list of IP/IPvs/FQDN>

As discussed above, in the examples provided herein, the networking devices 204a-204c and the server device(s) 202 are included in datacenter, with the networking devices 204a-204c operating to provide user devices (discussed below) access to the server device(s) 202. As will be appreciated by one of skill in the art in possession of the present disclosure, in some embodiments, the datacenter that includes the networking devices 204a-204c and the server device(s) 202 may prevent connectivity to the Internet by those devices. For example, for securities reasons, the networking devices 204a-204c may be prevented from accessing the Internet, or being accessed via the Internet, and instead may only be accessible via a Local Area Network (LAN) and/or other closed networked that would be apparent to one of skill in the art in possession of the present disclosure. However, while a specific networked system 200 in a "closed" datacenter (i.e., a non-Internet-connected datacenter) has been illustrated and described, one of skill in the art in possession of the present disclosure will recognize that the networking device credential information reset system of the present disclosure may include a variety of components and component configurations, and may be provided in a variety of locations with different communications capabilities, while remaining within the scope of the present disclosure as well.

Figure 3:
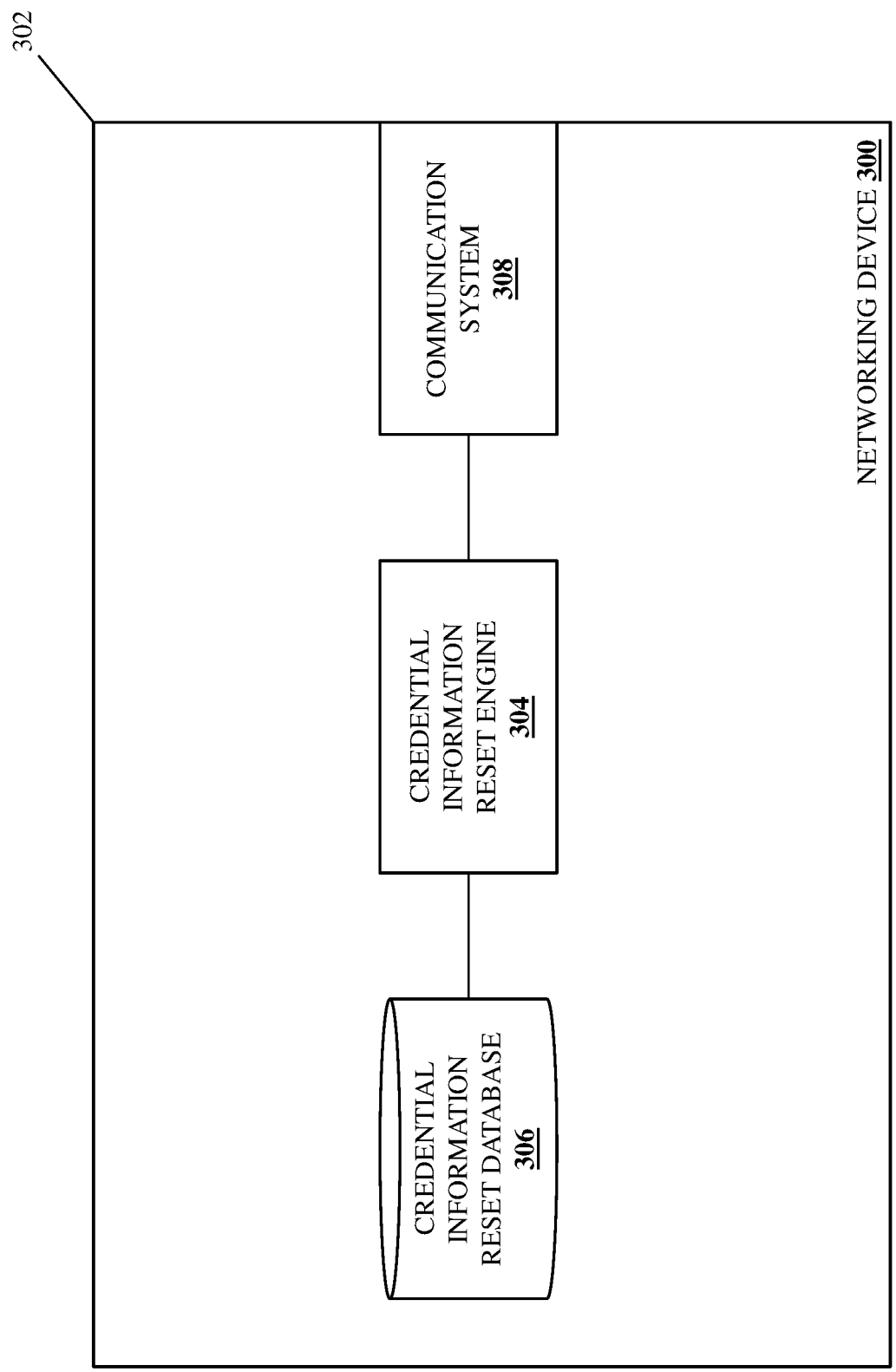
FIG. 3 is a schematic view illustrating an embodiment of a networking device that may be included in the networked system of FIG. 2A.

Referring now to FIG. 3, an embodiment of a networking device 300 is illustrated that may provide any or each of the networking devices 204a-204c discussed above with reference to FIG. 2A. As such, the networking device 300 may be provided by the IHS 100 discussed above with reference to FIG. 1 and/or may include some or all of the components of the IHS 100, and in specific examples may be provided by a switch device. Furthermore, while illustrated and discussed as being provided by a switch device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a credential information reset engine 304 that is configured to perform the functionality of the credential information reset engines and/or networking devices discussed below.

In a specific example, the credential information reset engine 304 may be provided, at least in part, by a container-based credential information reset agent that may be included in an operating system or other application running on the networking device 300. For example, such a container-based credential information reset agent may be provided via a container available from DOCKER® of Palo Alto, California, United States, which one of skill in the art in possession of the present disclosure would recognize may provide a relatively lightweight, standalone executable software package that includes a container image having software code, runtime data, system tools, system libraries, settings, and/or any other information that one of skill in the art in possession of the present disclosure would recognize as being required to provide the functionality of the container-based credential information reset agent described herein. However, while a particular credential information reset engine 304 has been described, one of skill in the art in possession of the present disclosure will appreciate that the credential information reset engine 304 of the present disclosure may be provided in a variety of manners that will fall within the scope of the present disclosure as well.

The chassis 302 may also house a storage system (not illustrated, but which may include the storage 108 discussed above with reference to FIG. 1) that is coupled to the credential information reset engine 304 (e.g., via a coupling between the storage system and the processing system) and that includes a credential information reset database 306 that is configured to store any of the information utilized by the credential information reset engine 304 discussed below. The chassis 302 may also house a communication system 308 that is coupled to the credential information reset engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

As discussed herein, in some embodiments, the networking device 300 may be included in the credential information reset authorization cluster 206 discussed above, and thus may have been configured as part of a "trusted" domain that includes the credential information reset authorization devices 206a-206c that provide a group of trusted nodes (e.g., trusted networking devices such as switch devices) that, as described below, are configured to manage credential information reset requests from any particular networking device. Thus, one of skill in the art in possession of the present disclosure will appreciate how the networking device discussed below that has its user credential information reset may, in some situations, also be a networking device that provides a credential information reset authorization device. However, while a specific networking device 300 has been illustrated and described, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
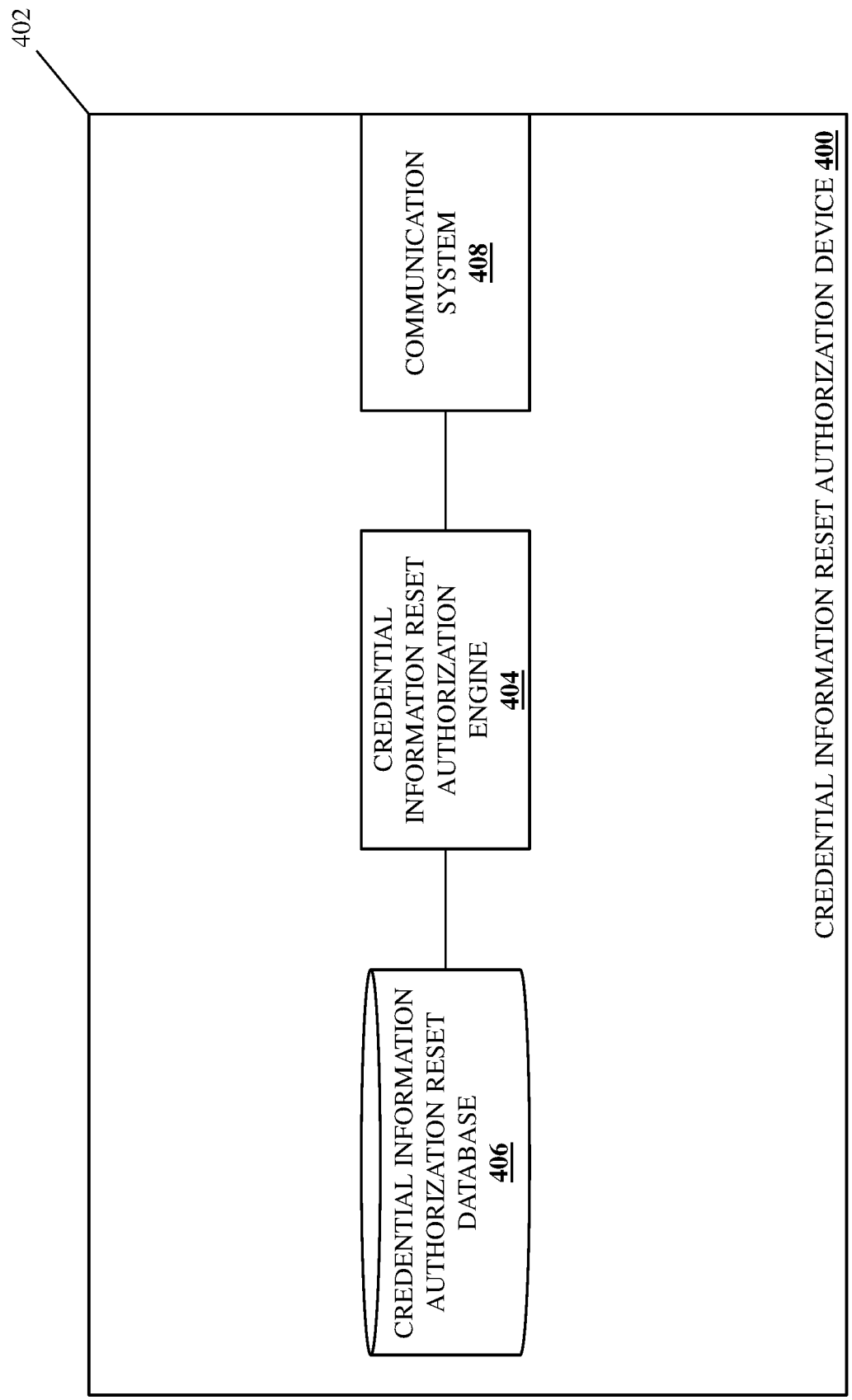
FIG. 4 is a schematic view illustrating an embodiment of a credential information reset authorization device that may be included in the networked system of FIG. 2A.

Referring now to FIG. 4, an embodiment of a credential information reset authorization device 400 is illustrated that may provide the any or each of the credential information reset authorization devices 206a-206c discussed above with reference to FIG. 2B. As such, the credential information reset authorization device 400 may be provided by the IHS 100 discussed above with reference to FIG. 1 and/or may include some or all of the components of the IHS 100, and in specific examples may be provided by a switch device. Furthermore, while illustrated and discussed as being provided by a switch device, one of skill in the art in possession of the present disclosure will recognize that the functionality of the credential information reset authorization device 400 discussed below may be provided by other devices that are configured to operate similarly as discussed below. In the illustrated embodiment, the credential information reset authorization device 400 includes a chassis 402 that houses the components of the credential information reset authorization device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a credential information reset authorization engine 404 that is configured to perform the functionality of the credential information reset authorization engines and/or credential information reset authorization devices discussed below.

In a specific example, the credential information reset engine 304 may be provided, at least in part, by a container-based credential information reset agent that may be included in an operating system or other application running on the networking device 300. For example, such a container-based credential information reset agent may be provided via a container available from DOCKER® of Palo Alto, California, United States, which one of skill in the art in possession of the present disclosure would recognize may provide a relatively lightweight, standalone executable software package that includes a container image having software code, runtime data, system tools, system libraries, settings, and/or any other information that one of skill in the art in possession of the present disclosure would recognize as being required to provide the functionality of the container-based credential information reset agent described herein. However, while a particular credential information reset engine 304 has been described, one of skill in the art in possession of the present disclosure will appreciate that the credential information reset engine 304 of the present disclosure may be provided in a variety of manners that will fall within the scope of the present disclosure as well.

The chassis 402 may also house a storage system (not illustrated, but which may include the storage 108 discussed above with reference to FIG. 1) that is coupled to the credential information reset authorization engine 404 (e.g., via a coupling between the storage system and the processing system) and that includes a credential information reset authorization database 406 that is configured to store any of the information utilized by the credential information reset authorization engine 404 discussed below. The chassis 402 may also house a communication system 408 that is coupled to the credential information reset authorization engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

As discussed herein, the credential information reset authorization device 400 is included in the credential information reset authorization cluster 206 discussed above, and thus has been configured as part of a "trusted" domain that includes the credential information reset authorization devices 206a-206c that provide a group of trusted nodes (e.g., trusted networking devices such as switch devices) that, as described below, are configured to manage credential information reset requests from any particular networking device. However, while a specific credential information reset authorization device 400 has been illustrated and described, one of skill in the art in possession of the present disclosure will recognize that credential information reset authorization devices (or other devices operating according to the teachings of the present disclosure in a manner similar to that described below for the credential information reset authorization device 400) may include a variety of components and/or component configurations for providing conventional credential information reset authorization device functionality, as well as the functionality discussed below, while remaining within the scope of the present disclosure as well.

Figure 5:
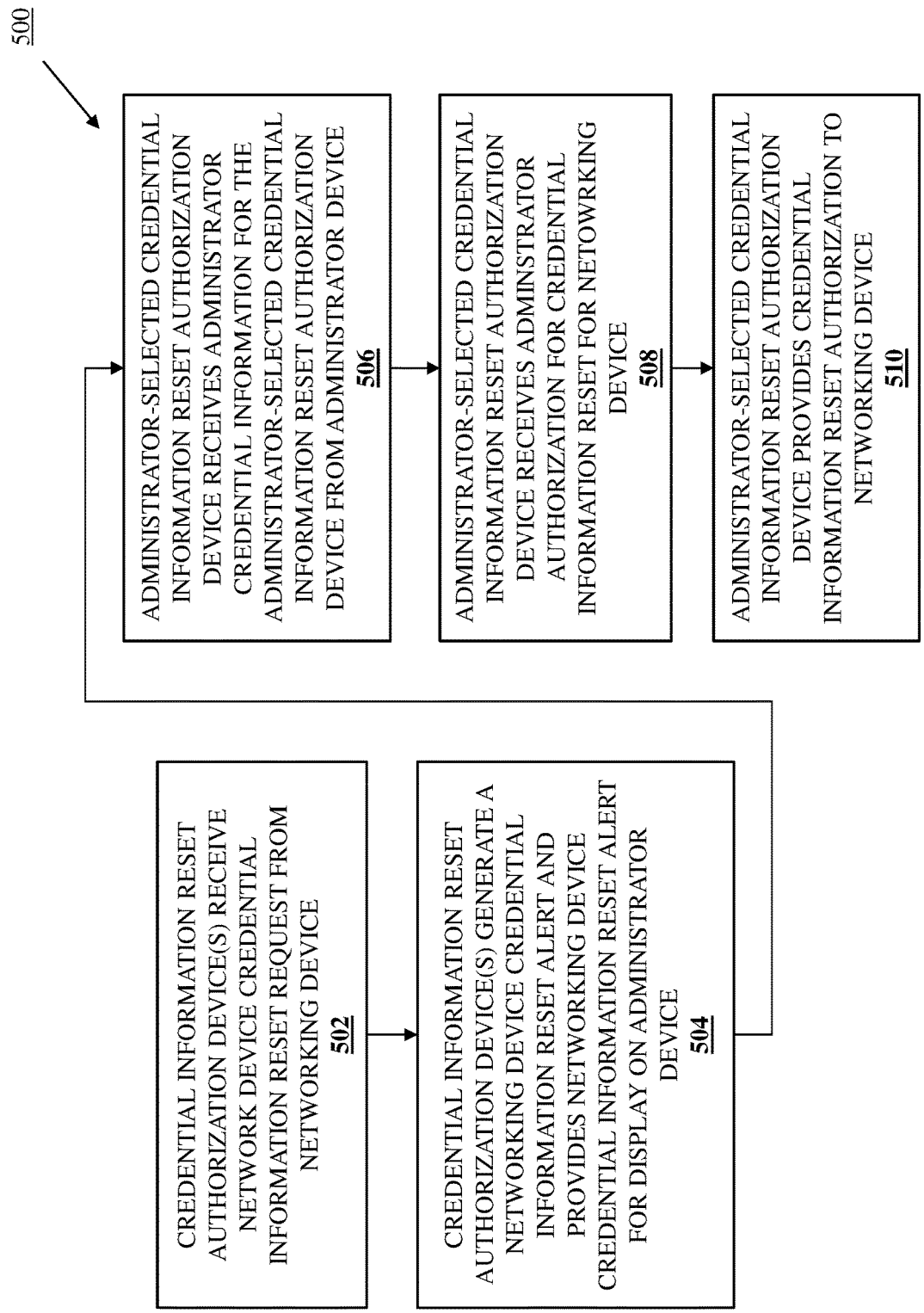
FIG. 5 is a flow chart illustrating an embodiment of a method for resetting credential information for a networking device.

Referring now to FIG. 5, an embodiment of a method 500 for resetting credential information for a networking device is illustrated. As discussed below, the systems and methods of the present disclosure provide for the resetting of credential information for a networking device via a credential information reset authorization device that is accessible to an administrator. For example, the networking device credential information reset system of the present disclosure may include credential information reset authorization devices coupled to a networking device. At least one of the credential information reset authorization devices receives a networking device credential information reset request from the networking device and, in response, generates a networking device credential information reset alert and provides it for display on an administrator device. Following the networking device credential information reset alert being provided for display on the administrator device, a first credential information reset authorization device receives first credential information for the first credential information reset authorization device from the administrator device, validates the first credential information and, in response, provides a credential information reset authorization to the networking device that is configured to cause the networking device to reset second credential information for the networking device. As will be appreciated by one of skill in the art in possession of the present disclosure, the systems and methods described herein operate to provide for the resetting of credential information for a networking device without network downtime or configuration loss, and may be particularly beneficial in situations where the networking device does not include Internet connectivity and/or the administrator does not have easy access to all of the networking devices/credential information reset authorization devices in a datacenter.

Figure 6:
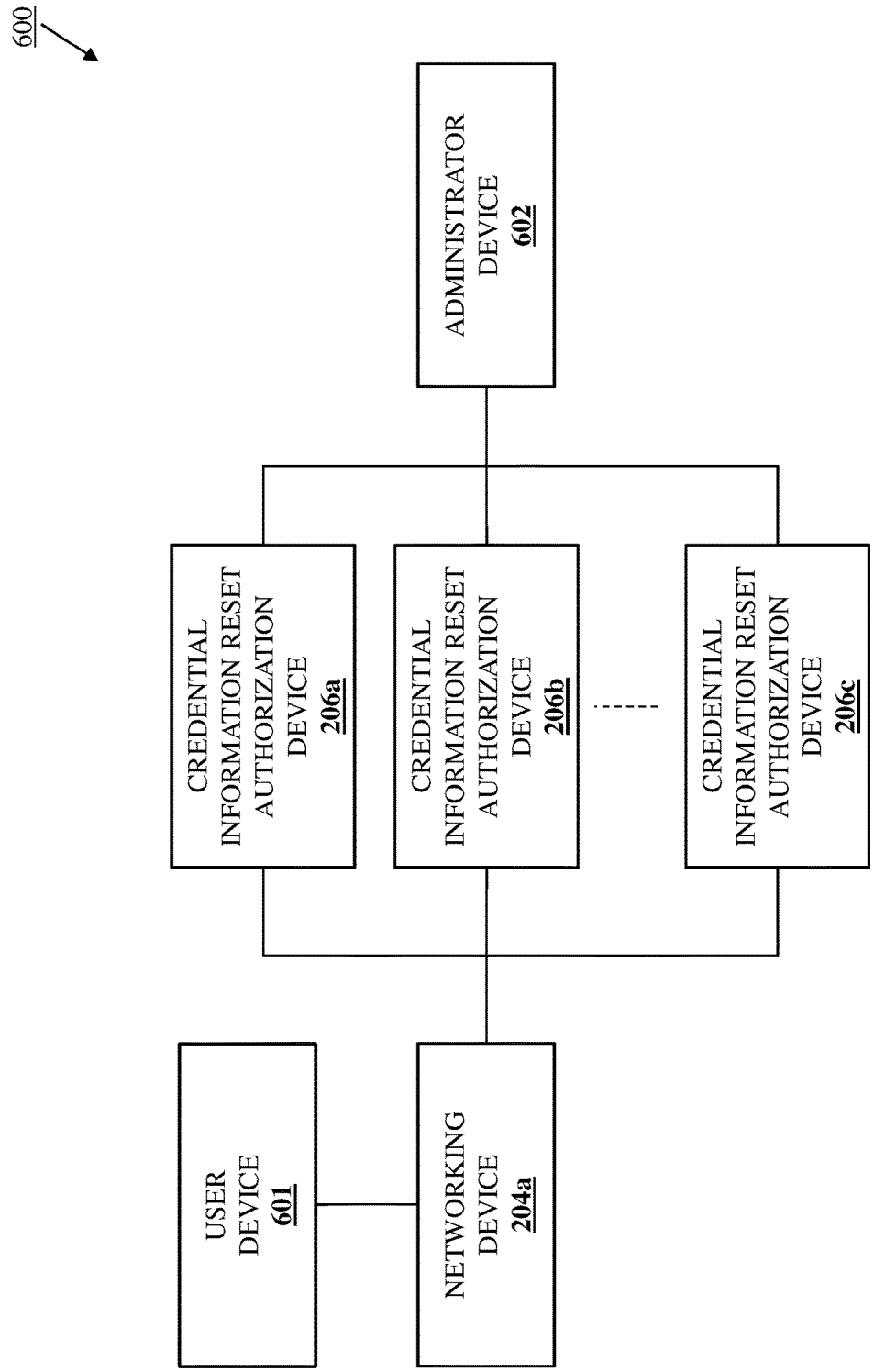
FIG. 6 is a schematic view illustrating an embodiment of the networking device credential information reset system of the present disclosure that is used to describe the method of FIG. 5.

With reference to FIG. 6, an embodiment of a networking device credential information reset system 600 is illustrated that is utilized in the examples of the method 500 described below. In the illustrated embodiment, the networking device credential information reset system 600 includes a user device 601. In an embodiment, the user device 601 may be provided by the IHS 100 discussed above with reference to FIG. 1, and/or may include some or all of the components of the IHS 100, and in the specific examples below is described as being provided by desktop computing devices, laptop/notebook computing devices, tablet computing devices, or mobile phones. However, while illustrated and discussed as being provided by particular devices, one of skill in the art in possession of the present disclosure will recognize that user devices provided in the networking device credential information reset system 600 may include other devices that may be configured to operate similarly as the user device 601 discussed below.

In the illustrated embodiment, the networking device 204a discussed above is coupled to the user device 601. However, while the examples below describe the credential information reset operations of the present disclosure being performed on the networking device 204a, one of skill in the art in possession of the present disclosure will appreciate how the credential information reset operations of the present disclosure may be performed on the other networking devices 204b and up to 204c while remaining within the scope of the present disclosure as well. In the illustrated embodiment, the credential information reset authorization devices 206a-206c that provide credential information reset authentication cluster 206 discussed above with reference to FIG. 2B are each coupled to the networking device 204a, and as discussed above the credential information reset authentication devices may be provided by the networking devices 204b and up to 204c in some embodiments. Furthermore, while the networking device 204a is illustrated and described below as not being one of the credential information reset authorization devices 206a-206c, as discussed above in some situations the networking device 204a (which has its credential information reset in the example below) may be one of the credential information reset authorization devices 206a-206c while remaining within the scope of the present disclosure as well.

In the illustrated embodiment, an administrator device 602 is illustrated as being coupled to each of the credential information reset authorization devices 206a-206c, but as discussed below other embodiments may include the administrator device 602 being coupled to (or having current access to) only one (or only a subset of) the credential information reset authorization devices 206a-206c. In an embodiment, the administrator device 602 may be provided by the IHS 100 discussed above with reference to FIG. 1, and/or may include some or all of the components of the IHS 100, and in the specific examples below is described as being provided by desktop computing devices, laptop/notebook computing devices, tablet computing devices, or mobile phones. However, while illustrated and discussed as being provided by particular devices, one of skill in the art in possession of the present disclosure will recognize that administrator devices provided in the networking device credential information reset system 600 may include other devices that may be configured to operate similarly as the administrator device 602 discussed below. However, while a specific networking device credential information reset system 600 has been illustrated and described, one of skill in the art in possession of the present disclosure will appreciate how the networking device credential information reset system 600 may include a variety of different components and/or configurations that will fall within the scope of the present disclosure as well.

Figure 7A:
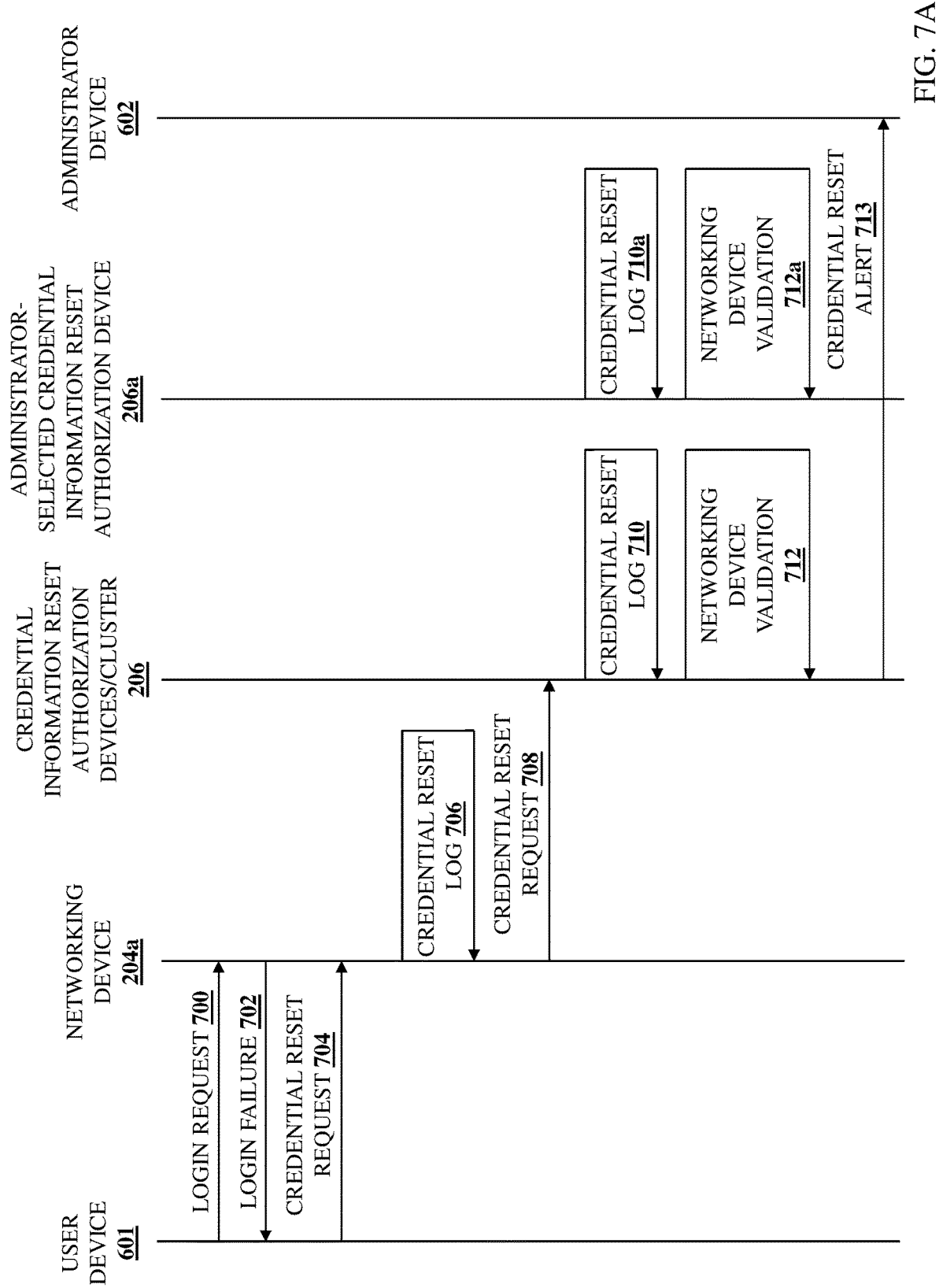
FIG. 7A is a swim lane diagram view illustrating an embodiment of the networking device credential information reset system of FIG. 6 operating during the method of FIG. 5.
Figure 7B:
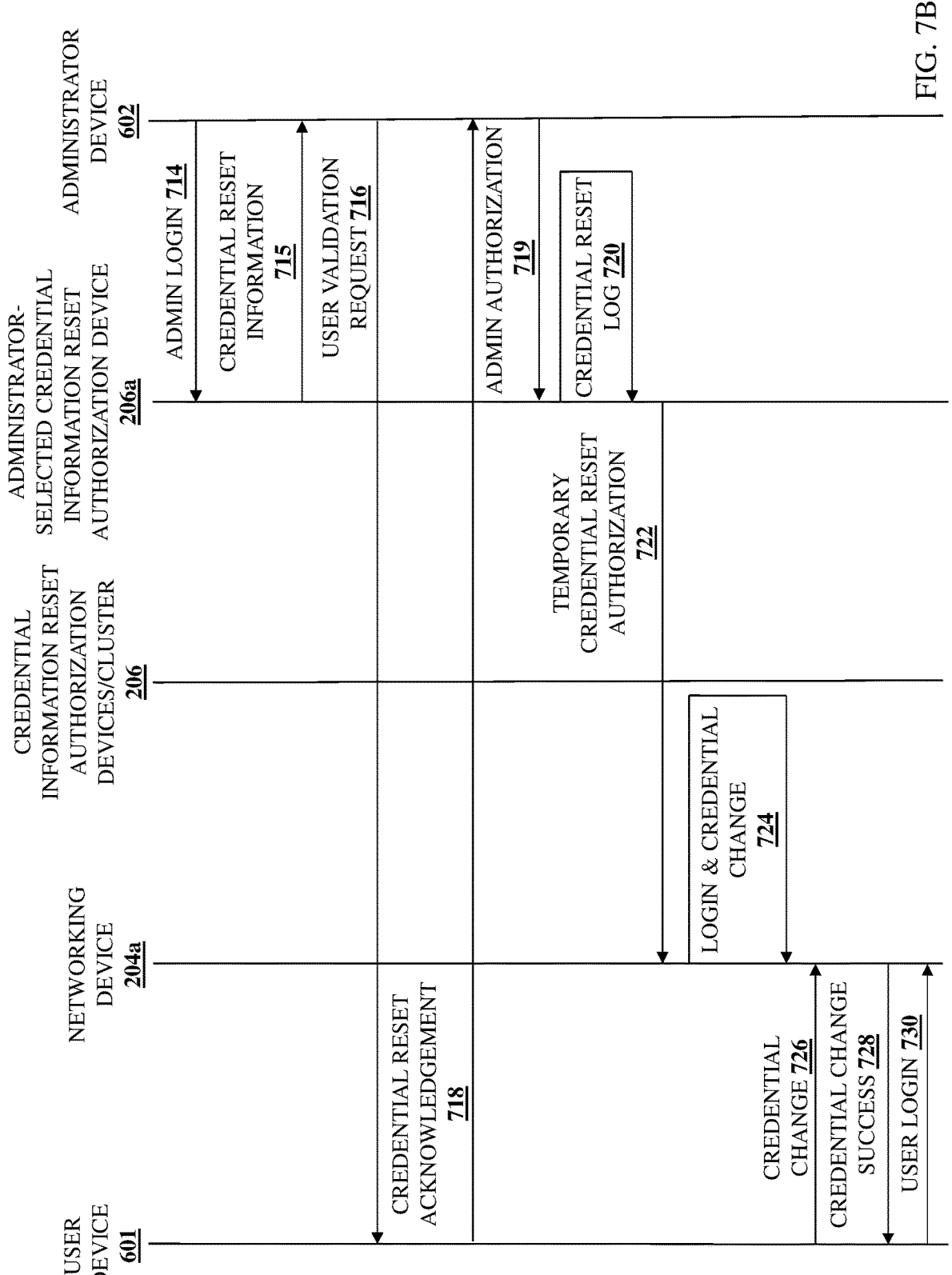
FIG. 7B is a swim lane diagram view illustrating an embodiment of the networking device credential information reset system of FIG. 6 operating during the method of FIG. 5.

With reference to the swim-lane diagram illustrated in FIGS. 7A and 7B, both "credential information reset authorization devices/cluster 206" and an "administrator-selected credential information reset authorization device 206a" are illustrated. As discussed below, an administrator in control of the administrator device 602 may select any of the credential information reset authorization devices 206a-206c for use in performing the method 800, and that credential information reset authorization device selected by the administrator will then become the "administrator-selected credential information reset authorization device". For example, as discussed below, an administrator may be currently logged into one of the credential information reset authorization devices, may have easy access to their administrator password for one of the credential information reset authorization devices, etc., and thus may select that credential information reset authorization device as the "administrator-selected credential information reset authorization device" for use in performing the method 800 as discussed below. However, while a few specific examples are provided, one of skill in the art in possession of the present disclosure will appreciate that an administrator may select one of the credential information reset authorization devices as the "administrator-selected credential information reset authorization device" discussed below for a variety of reasons that will fall within the scope of the present disclosure as well.

As such, the specific embodiment illustrated in FIGS. 7A and 7B and described below provides an example in which the administrator in control of the administrator device 602 selects the credential information reset authorization device 206a for use in performing the method 800, and thus the credential information reset authorization devices 206b and up to 206c are represented in FIGS. 7A and 7B as the "credential information reset authorization devices 206", while the credential information reset authorization device 206a become the "administrator-selected credential information reset authorization device 206a". However, while the credential information reset authorization device 206a is illustrated and described as providing the "administrator-selected credential information reset authorization device", one of skill in the art in possession of the present disclosure will appreciate how any of the credential information reset authorization devices 206b-206c may provide the "administrator-selected credential information reset authorization device" while remaining within the scope of the present disclosure.

Figure 8A:
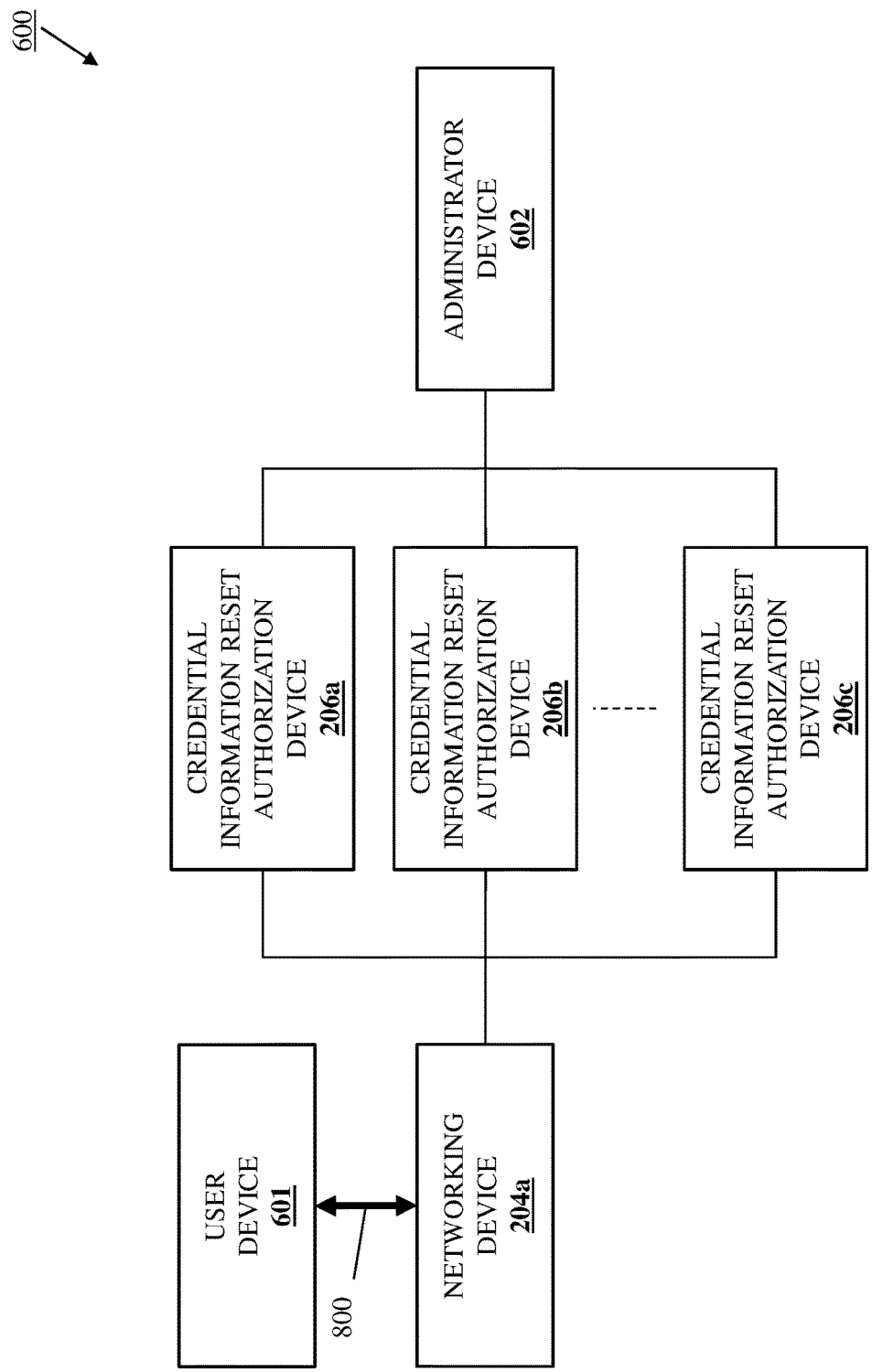
FIG. 8A is a schematic view illustrating an embodiment of the networking device credential information reset system of FIG. 6 operating during the method of FIG. 5.

The method 500 begins at block 502 where one or more credential information reset authorization devices receive a network device credential information reset request from a networking device. With reference to FIG. 8A, in an embodiment of block 502, the credential information reset engine 304 in the networking device 204a/300 may perform network device credential information reset request receiving operations 800 that may include receiving a request from the user device 601 to reset credential information for the networking device 204a. For example, during or prior to the method 500, a user of the user device 601 may determine they have lost their credential information for the networking device 204a and, in response, may request to reset that credential information. For example, with reference to FIG. 7A, the user of the user device 601 may cause the user device 601 to provide a login request 700 including credential information to networking device 204a. In a specific example, the credential information provided in the login request 700 may include a username and password, a biometric scan such as a fingerprint scan or a facial scan, and/or any other credential information that would be apparent to one of skill in the art in possession of the present disclosure.

As will be appreciated by one of skill in the art in possession of the present disclosure, the credential information provided in the login request 700 may be incorrect or otherwise not sufficient to authorize access to the networking device 204a. For example, a username and/or password that provides the credential information may have been input incorrectly by the user of the user device 601, or a biometric scan that provides the credential information may have not captured biometric information that matches authorized biometric scans stored in the networking device 204a. However, while two specific credential information insufficiencies are described below, one of skill in the art in possession of the present disclosure will appreciate how credential information may not authorize access to the networking device 204a for a variety of reasons that will fall within the scope of the present disclosure. In response to determining that the credential information provided in the login request 700 is not sufficient to authorize access to the networking deice 204a, the credential information reset engine 304 in the networking device 204a/300 may provide a login failure 702 to the user device 601, which one of skill in the art in possession of the present disclosure will appreciate may include displaying an indication on the user device 601 of the insufficiency of the credential information provided in the login request 700 to authorize access to the networking device 204a (e.g., "LOGIN FAILED").

In response to receiving the login failure 702, the user of the user device 601 may cause the user device 601 to provide a credential reset request 704 to the networking device 204a. As will be appreciated by one of skill in the art in possession of the present disclosure, some networking devices may not place a limit on the number of times a user may attempt unsuccessful logins, and thus in some situations the user of the user device 601 may cause the user device 601 to provide a credential reset request 704 to the networking device 204a after some number of iterations of the login request 700/ login failure 702 have convinced the user that they have "lost" their credential information for the networking device 204a and must have it reset. However, many networking devices may place a limit on the number of times a user may attempt unsuccessful logins, and thus in some situations the user of the user device 601 may be "locked out" of the networking device 204a after attempting a threshold number of unsuccessful login attempts, and thus may cause the user device 601 to provide a credential reset request 704 to the networking device 204a in order to attempt to "unlock" the networking device 204a and regain access to it.

As such, the credential information reset engine 304 in the networking device 204a/300 may receive the credential reset request 704 from the user device 601 as part of the network device credential information reset request receiving operations 800 at block 502. In some embodiments, in response to receiving the credential reset request 704, the credential information reset engine 304 in the networking device 204a/300 may generate a credential reset log 706. For example, the credential reset log 706 generated in response to receiving the credential reset request 704 may include the credential information reset engine 304 in the networking device 204a/300 generating and logging a system log (syslog) critical alert that identifies the user of the user device 601, the networking device 204a, the fact that a request was made by that user to reset their credential information for that networking device 204a, and/or any other credential information reset/syslog information that would be apparent to one of skill in the art in possession of the present disclosure. However, while a particular credential reset alert/log has been described, one of skill in the art in possession of the present disclosure will appreciate how the request to reset credentials for the networking devices may cause the generation of any of a variety of alerts/logs while remaining within the scope of the present disclosure as well.

Figure 8B:
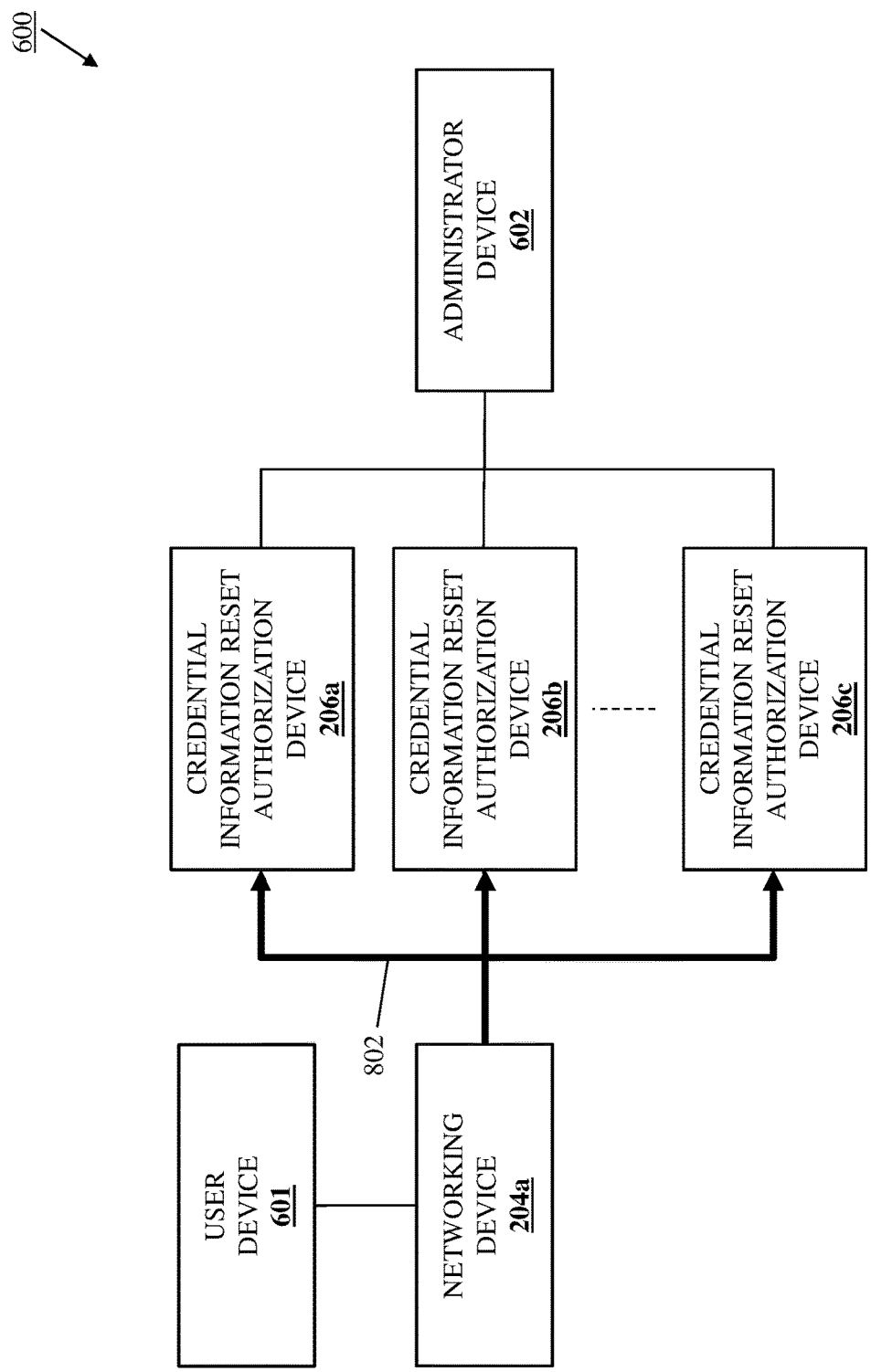
FIG. 8B is a schematic view illustrating an embodiment of the networking device credential information reset system of FIG. 6 operating during the method of FIG. 5.

With reference to FIGS. 7A and 8B, in an embodiment of block 502 and in response to receiving the credential reset request 704, the credential information reset engine 304 in the networking device 204a/300 may perform credential reset request operations 802 that include transmitting a credential reset request 708 to one or more of the credential information reset authorization device(s) 206a-206c. For example, in response to receiving the credential reset request 704, the credential information reset engine 304 in the networking device 204a/300 may broadcast the credential reset request 708 to all of the credential information reset authorization device(s) 206a-206c. As such, in some embodiments of block 502, the credential information reset authorization engine 404 in each of the credential information reset authorization device(s) 206a-206c may receive the credential reset request 708 from the networking device 204a. In some embodiments, the credential reset request 708 may be provided by an encrypted credential information reset message that may include information about the user, the user device 601, the networking device 204a, and/or any other credential information reset data that would be apparent to one of skill in the art in possession of the present disclosure. However, while a specific credential reset request has been described, one of skill in the art in possession of the present disclosure will appreciate how the credential reset request may include a variety of information that will fall within the scope of the present disclosure as well.

However, one of skill in the art in possession of the present disclosure will appreciate how the networking device 204a may provide the credential reset request 708 to a subset of the credential information reset authorization device(s) 206a-206c while remaining within the scope of the present disclosure as well. Furthermore, while not illustrated or described in detail below, as discussed above in some embodiments, the networking device 204a may also be one of the credential information reset authorization devices 206a-206c, and thus the provisioning of the credential reset request 708 may include transmitting that credential reset request 708 to itself. Thus, one of skill in the art in possession of the present disclosure will appreciate how the operations described below as being performed by the credential information reset authorization devices 206a-206c may be performed by the networking device 204a as well in embodiments that have that networking device 204a included in the credential information reset authorization cluster 206 and thus operating as one of the credential information reset authorization devices 206a-206c.

With reference to FIG. 7A, in some embodiments, the credential information reset authorization engine 404 in any credential information reset authorization device 400 receiving the credential reset request 708 may generate a credential reset log 710. For example, in response to receiving the encrypted credential information reset message, the credential information reset authorization engine 404 in the credential information reset authorization device 400 decrypt that encrypted credential information reset message in order to access the information included therein and, in response, generate the credential reset log 710. In an embodiment, the credential reset log 710 generated in response to receiving the credential reset request 708 may include the credential information reset authorization engine 404 in the credential information reset authorization device 400 generating and logging a system log (syslog) critical alert that identifies the user of the user device 601, the networking device 204a, the fact that a request was made by that user to reset their credential information for that networking device 204a, and/or any other credential information reset/syslog information that would be apparent to one of skill in the art in possession of the present disclosure. However, while a particular credential reset alert/log has been described, one of skill in the art in possession of the present disclosure in the art in possession of the present disclosure will appreciate how the request to reset credentials for the networking devices may cause the generation of any of a variety of alerts/logs while remaining within the scope of the present disclosure as well. Furthermore, as discussed above, the credential reset log 710 may be generated by each of the credential information reset authorization devices/cluster 206, with the administrator-selected credential information reset authorization device 206a illustrated in FIGS. 7A and 7B generating a credential reset log 710a that is substantially similar to the credential reset log 710 with the exception that it is generated on the credential information reset authorization device that ends up being selected by the administrator to perform the method 800.

With continued reference to FIG. 7A, in some embodiments, the credential information reset authorization engine 404 in any credential information reset authorization device 400 receiving the credential reset request 708 may perform networking device validation 712 in order to validate the networking device 204a from which it received the credential reset request 708. For example, the validation of the networking device 204a by any of the credential information reset authorization devices 400 may include software-based validation, hardware-based validation, validation via a variety of switch information (e.g., a service tag, Media Access Control (MAC) address, licensing information, etc.), validation via the trusted domain configurations discussed above, and/or any other validation techniques that one of skill in the art in possession of the present disclosure would recognize as validating a networking device requesting the reset of credential information in a manner that ensures that the request to reset the credential information has be received from aa networking device that is authorized to have its credential information reset in such a manner. Similarly as described above for the credential reset logs 710/710a, the networking device validation 712 may be performed by each of the credential information reset authorization devices 206, with the administrator-selected credential information reset authorization device 206a performing networking device validation 712a illustrated in FIG. 7A that is substantially similar to the networking device validation 712 with the exception that it is performed on the credential information reset authorization device that ends up being selected by the administrator to perform the method 800.

Figure 8C:
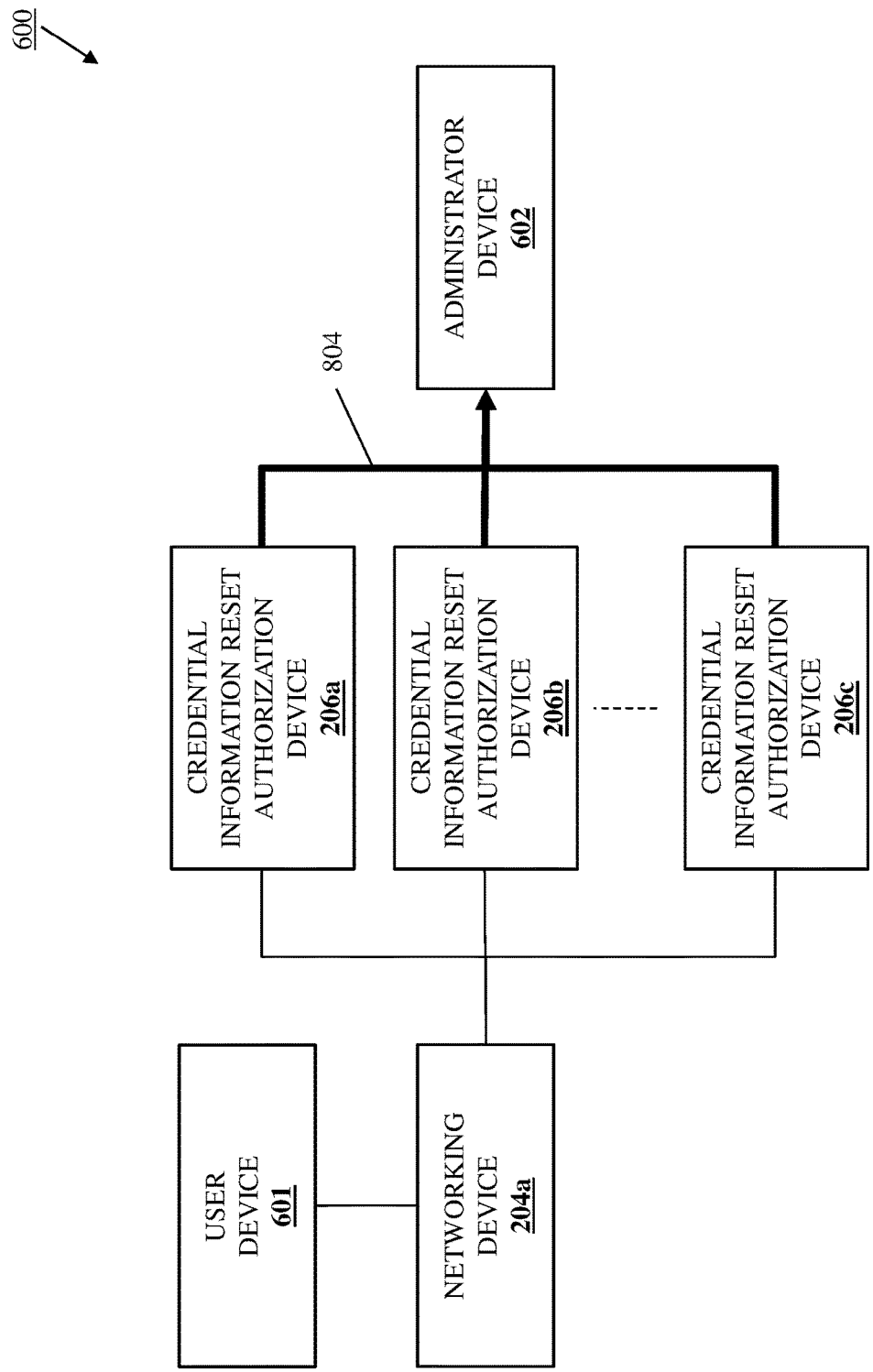
FIG. 8C is a schematic view illustrating an embodiment of the networking device credential information reset system of FIG. 6 operating during the method of FIG. 5.

The method 500 then proceeds to block 504 where the one or more credential information reset authorization device(s) generate a networking device credential information reset alert and provide the networking device credential information reset alert for display on an administrator device. With reference to FIGS. 7A and 8C, in an embodiment of block 504, the credential information reset authorization engine 404 in any or all of the credential information reset authorization device(s) 206a-206c may perform networking device credential information reset alert operations 804 which may include providing a credential reset alert 713 to the administrator device 602.

For example, in response to receiving the credential reset request 708 and, in some cases, validating the networking device 204a, the credential information reset authorization engine 404 in one or more of the credential information reset authorization device(s) 206a-206c/400 may provide the credential reset alert 713 to administrator device 602. As such, while FIG. 8C illustrates all of the credential information reset authorization devices 206a-206c performing the networking device credential information reset alert operations 804 to provide the credential reset alert 713 to the administrator device 602, one of skill in the art in possession of the present disclosure will appreciate how only one (or a subset) of the credential information reset authorization devices 206a-206c need provide the credential reset alert 713 to the administrator device 602.

In an embodiment, the credential reset alert 713 may be broadcast to any active session in which the administrator is currently logged into using the administrator device 602, and thus some examples will include the administrator currently being logged into an active session with one of the credential information reset authorization devices 206a-

206c and receiving the credential reset alert 713, the administrator currently being logged into an active session with a device that is accessible to one of the credential information reset authorization devices 206a-206c and receiving the credential reset alert 713, etc. In specific examples, the credential reset alert 713 may be provided in an email, a text message, a pop-up message, and/or any other notification or alert that is configured for display on the administrator/administrator device(s) 602 (e.g., via the active session discussed above) in order to notify the administrator of the credential reset request 708. In another specific example, the credential reset logs 706/710/710a discussed above may cause the credential reset alert 713 to the administrator device 602 as discussed above. However, while specific credential reset alerts (and triggers for sending such credential reset alerts) have been described, one of skill in the art in possession of the present disclosure will appreciate how other techniques to alert an administrator of the request to reset credentials for a networking device may be utilized while remaining within the scope of the present disclosure as well.

Figure 8D:
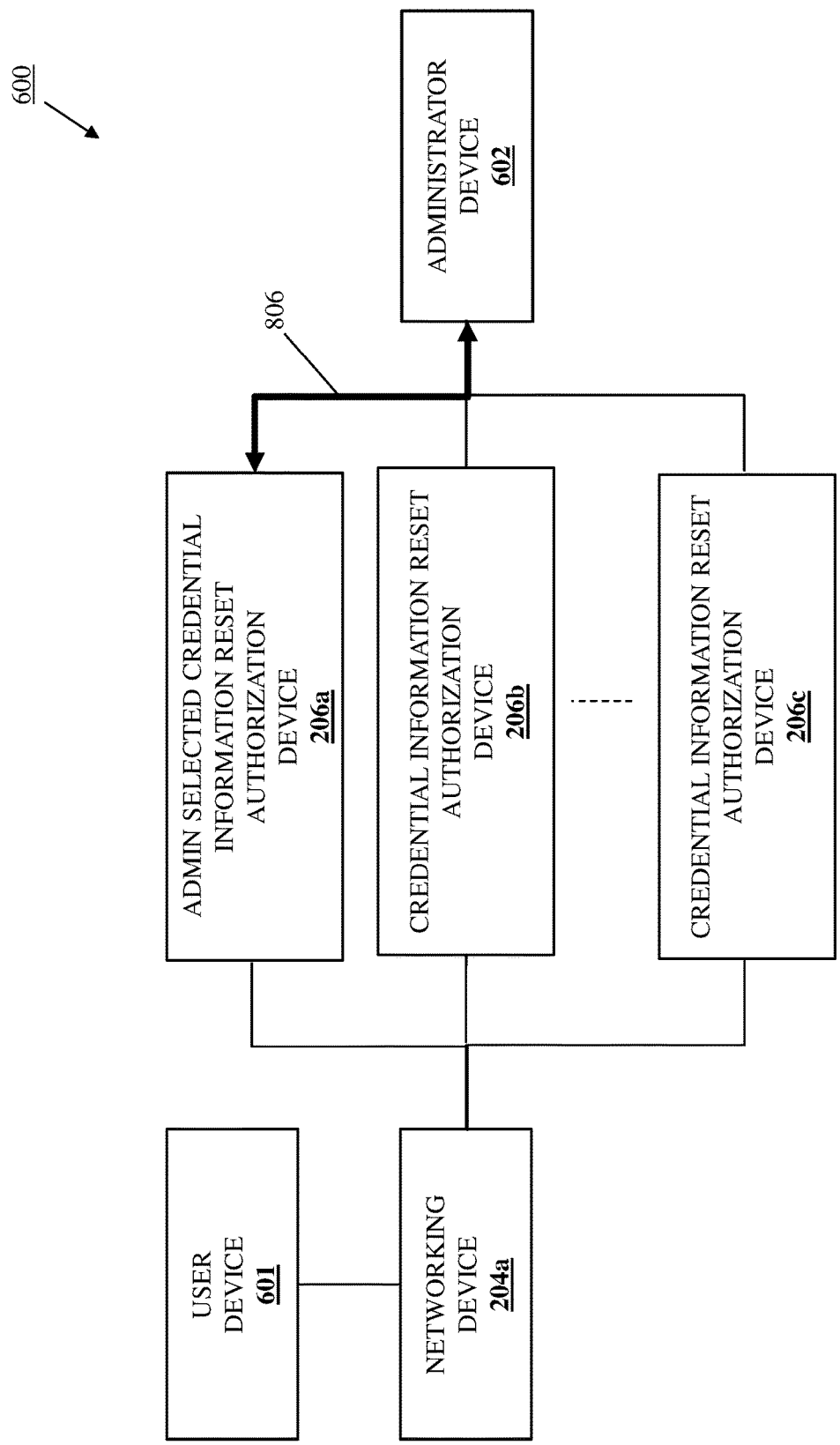
FIG. 8D is a schematic view illustrating an embodiment of the networking device credential information reset system of FIG. 6 operating during the method of FIG. 5.

The method 500 then proceeds to block 506 where an administrator-selected credential information reset authorization device receives administrator credential information for the administrator-selected credential information reset authorization device from the administrator device. With reference to FIG. 8D, in an embodiment of block 506, the administrator device 602 may perform administrator credential information provisioning operation 806 that include providing administrator credential information to an administrator-selected credential information reset authorization device. As discussed above, in the examples provided herein and in response to receiving the credential reset alert, the administrator using the administrator device 602 selects the credential information reset authorization device 206a as an "administrator-selected credential information reset authorization device" for use in the performing the method 800.

For example, the administrator may have easy access to their administrator credential information for the credential information reset authorization device 206a, and thus may select it as the "administrator-selected credential information reset authorization device" for use in the performing the method 800 over the other credential information reset authorization devices 206b-206c by providing that administrator credential information at block 506. In another example, the administrator may already be logged into the credential information reset authorization device 206a (e.g., the administrator may currently be in the active session discussed above with the credential information reset authorization device 206a), and thus its selection as the "administrator-selected credential information reset authorization device" (i.e., the provisioning of the administrator credential information) may have occurred prior to receiving the credential reset alert 713 at the administrator device 602. However, while a few specific examples are provided, one of skill in the art in possession of the present disclosure will appreciate how the administrator may select any credential information reset authorization device 206a-206c in the credential information reset authorization cluster 206 in order to perform the remainder of the method 800 while remaining within the scope of the present disclosure as well. Thus, in some embodiments, the administrator need only know (or have easy access to) their administrator credential information for one of the credential information reset authorization devices 206a-206c in order to authorize the reset of credential information on the networking device 204a.

With reference to FIG. 7B, the administrator credential information provisioning operations 806 may include administrator device 602 performing administrator login operations 714 with the administrator-selected credential information reset authorization device 206a. For example, in an embodiment, the administrator/user of administrator device 602 may provide a username and password, a biometric scan such as a fingerprint scan or a facial scan, and/or any other administrator credential information that would be apparent to one of skill in the art in possession of the present disclosure to the administrator-selected credential information reset authorization device 206a. As such, the credential information reset authorization engine 404 in the credential information reset authorization device 206a/400 may receive that administrator credential information at block 506. As will be appreciated by one of skill in the art in possession of the present disclosure, the administrator login operations 714 may also include the credential information reset authorization engine 404 in the credential information reset authorization device 206a/400 validating the administrator credential information using any of variety of credential information validation techniques known in the art. However, while a particular administrator login/credential authorization has been described, one of skill in the art in possession of the present disclosure will appreciate how a variety of techniques for an administrator to login to a device may be utilized at block 506 while remaining within the scope of the present disclosure as well.

Figure 8E:
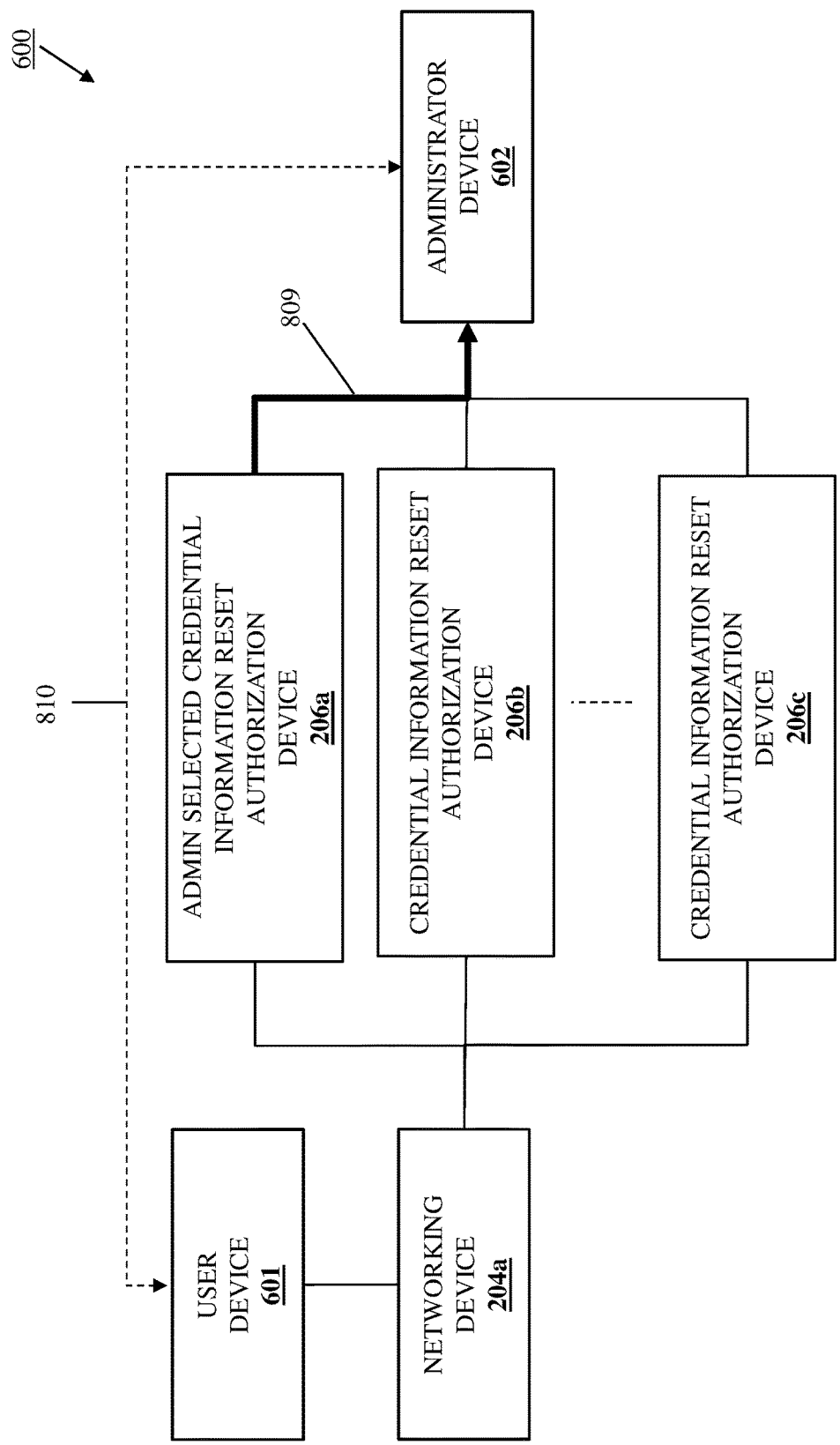
FIG. 8E is a schematic view illustrating an embodiment of the networking device credential information reset system of FIG. 6 operating during the method of FIG. 5.

With reference to FIGS. 7B and 8E, in an embodiment of block 506 and in response to validating the administrator credential information as part of the administrator login operations 714, the credential information reset authorization engine 404 in the administrator-selected credential information reset authorization device 206a/400 may perform credential reset information provisioning operations 809 that include providing credential reset information 715 to the administrator device 602. In an embodiment, the credential reset information provided to the administrator device 602 may include the information included in the credential reset request 708 such as the information about the user, the user device 601, the networking device 204a, and/or any other credential information reset data that would be apparent to one of skill in the art in possession of the present disclosure, and one of skill in the art in possession of the present disclosure will recognize that a variety of information that may be used to validate the request from the user of the user device 601 to reset their credential information for the networking device 204a in the manner discussed below.

For example, the credential reset information may include Internet Protocol (IP) addresses of the user device 601 and/or the networking device 204a, contact information for the user of the user device 601 (e.g., an email address, phone number, etc.), and/or any other information that one of skill in the art in possession of the present disclosure would recognize as allowing for the confirmation that the request to reset the credentials for the networking device 204a should be authorized as discussed below. However, while particular examples of credential reset information have been described, one of skill in the art in possession of the present disclosure will appreciate how any of a variety of information for confirming a credential reset request may be utilized while remaining within the scope of the present disclosure as well With reference to FIGS. 7B and 8E, in an embodiment of block 506 and in response to receiving the credential reset information, the administrator/user of administrator device 602 and the user of the user device 604 (or the administrator device 602 and the user device 601) may perform user validation operations 810, which may include the administrator/administrator device 602 providing a user validation request 716 to the user/user device 601, and the user/user device 601 responding with a credential reset acknowledgement 718. For example, using the contact information included in the credential reset information, the administrator may contact the user of user device 601 via an email, a text message, a phone call, and/or using other communication techniques that would be apparent to one of skill in the art in possession of the present disclosure in order to confirm that user is requesting a credential information reset for the networking device 204a (i.e., the user validation request 716), and the user may respond with the credential reset acknowledgement 718. As will be appreciated by one of skill in the art in possession of the present disclosure in the art in possession of the present disclosure, the dotted line in FIG. 8E for the user validation operations 810 are meant to indicate that those operations may not actually be performed by the administrator device 602 and the user device 601, and rather may be performed by their users "offline" or otherwise without necessarily using of the administrator device 602 and the user device 601 (e.g., when performing the user validation operations 810 via the phone call or text message discussed above).

However, in another example, the user validation operations 810 may include automated validation techniques such as, for example, the administrator device 602 requesting that the user device 601 sign a cryptographic certificate in order to confirm its identity as the device requesting the credential information reset for the networking device 204a (i.e., the user validation request 716), and the user device 601 signing the cryptographic certificate and transmitted it to the administrator device 602 (i.e., the credential reset acknowledgement 718). However, while particular examples of user validation operations have been illustrated and described, one of skill in the art in possession of the present disclosure in the art in possession of the present disclosure will appreciate how any techniques for user validation may be utilized while remaining within the scope of the present disclosure as well.

Figure 8F:
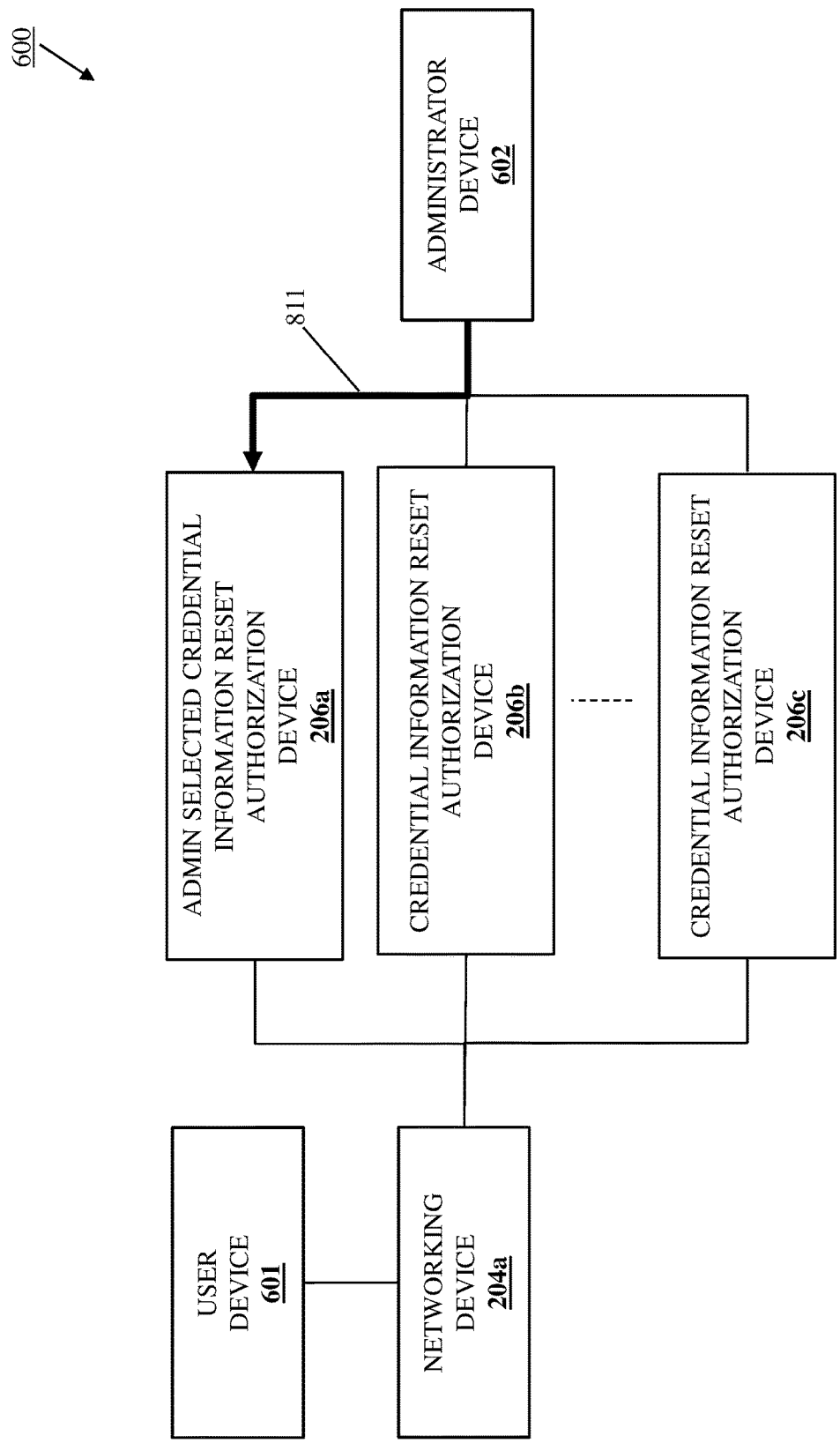
FIG. 8F is a schematic view illustrating an embodiment of the networking device credential information reset system of FIG. 6 operating during the method of FIG. 5.

The method 500 then proceeds to block 508 where administrator-selected credential information reset authorization device receives administrator authorization for credential information reset for networking device. With reference to FIGS. 7B and 8F, in an embodiment of block 508, the administrator device 602 may perform credential information reset authorization operations 811 that may include providing an administrator authorization 719 to the administrator-selected credential information reset authorization device 206a. For example, at block 508, the administrator of the administrator device 602 may provide permission, confirmation, and/or any other authorization that one of skill in the art in possession of the present disclosure would recognize as authorizing the administrator-selected credential information reset authorization device 206a to allow the user of the user device 601 to access the networking device 204a and select, define, and/or otherwise provide new credential information.

For example, the administrator authorization 719 may include a manual authorization provided by the administrator via a Graphical User Interface (GUI) via the selection of an "credential information reset authorization button", or via Command Line Interface (CLI) displayed on the administrator device 602 via the provisioning of a credential information reset authorization command. In another example, the administrator authorization 719 may include automated authorization provided by the administrator device 602 in response to the automated user validation request 716 and credential reset acknowledgement 718 discussed above (e.g., the administrator device 602 may automatically send the administrator authorization 719 if the user device 601 provides the signed cryptographic certificate discussed above). However, while several specific examples of user validation have been described, one of skill in the art in possession of the present disclosure will appreciate how any techniques for providing an authorization to reset credential information may be utilized while remaining within the scope of the present disclosure as well. As will be appreciated by one of skill in the art in possession of the present disclosure, the user validation operations 810 and administrator authorization 719 may operate as a multi-factor validation and authorization of the resetting of credential information for the networking device 204a.

With reference to FIG. 7B, in an embodiment of block 508 and in response to receiving the administration authorization 719, the credential information reset authorization engine 404 in the administrator-selected credential information reset authorization device 206a may generate a credential reset log 720. For example, in response to receiving the administrator authorization 719, the credential information reset authorization engine 404 in the administrator-selected credential information reset authorization device 206a may generate and create a system log (syslog) critical alert that may identify the administrator device 602, the user device 601, the networking device 204a, the administrator-selected credential information reset authorization device 206a, the fact that the administrator device authorized a credential information reset for the networking device 204a by the user device 601, and/or any other credential information reset authorization information that would be apparent to one of skill in the art in possession of the present disclosure.

Figure 8G:
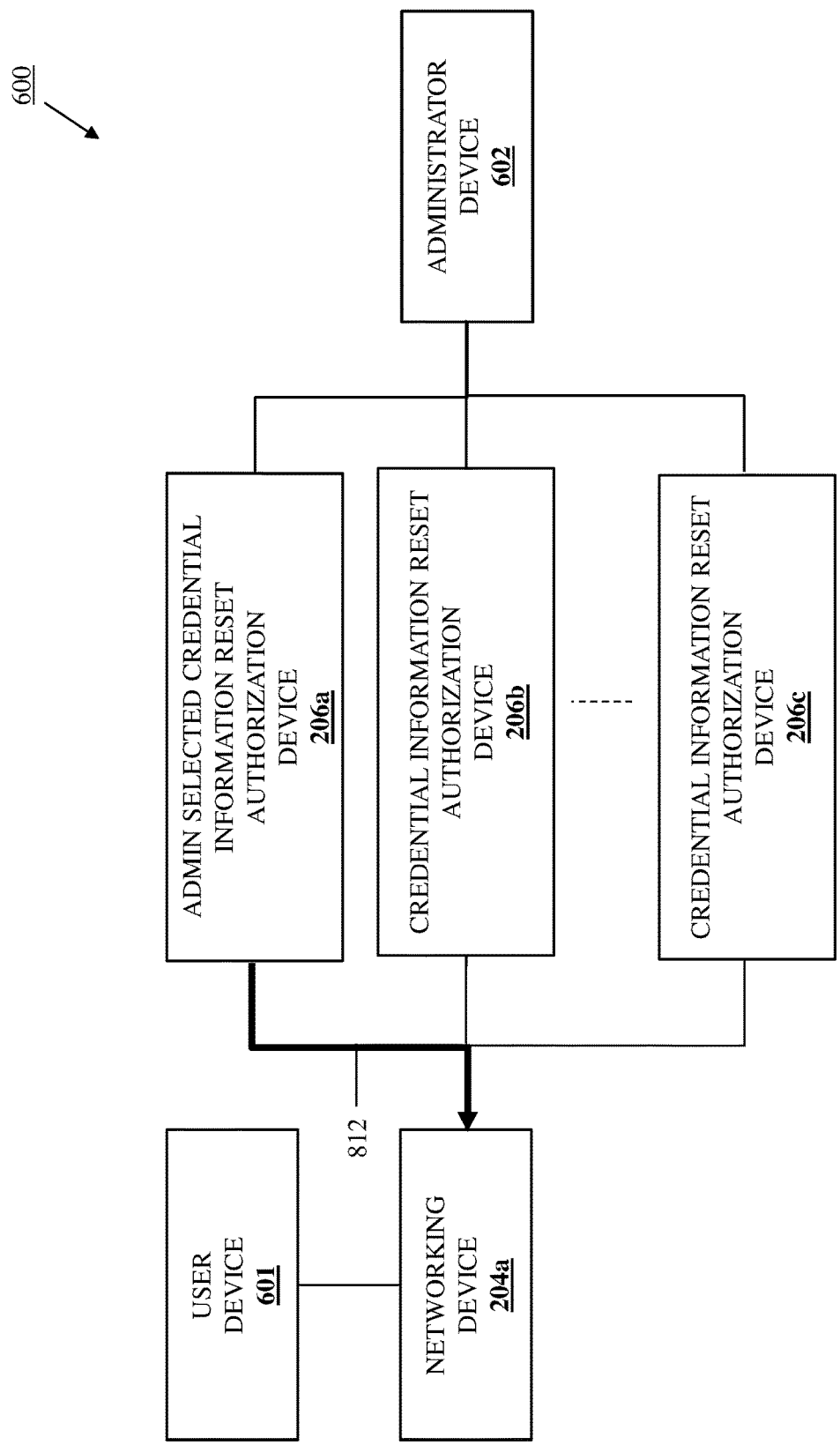
FIG. 8G is a schematic view illustrating an embodiment of the networking device credential information reset system of FIG. 6 operating during the method of FIG. 5.

The method 500 then proceeds to block 510 where the administrator-selected credential information reset authorization device provides credential information reset authorization to the networking device. With reference to FIGS. 7B and 8G, in an embodiment of block 510, the credential information reset authorization engine 404 in the administrator-selected credential information reset authorization device 206a/400 may perform credential information reset authorization operations 812 that may include includes providing a temporary credential reset authorization 722 to the networking device 204a. For example, at block 510, the credential information reset authorization engine 404 in the administrator-selected credential information reset authorization device 206a may provide temporary permission, confirmation, and/or any other authorization that one of skill in the art in possession of the present disclosure would recognize as authorizing the networking device 204a to allow the user of the user device 601 to access the networking device 204a and select, define, and/or otherwise provide new credential information as described below. As will be appreciated by one of skill in the art in possession of the present disclosure, the temporary credential reset authorization 722 may be "temporary" in that it may configure networking device 204a to allow the user of the user device 601 to access the networking device 204a and select new credential information for a limited amount of time (e.g., 15 minutes, 1 hour, and/or other time periods that would be apparent to one of skill in the art in possession of the present disclosure). However, while a temporary permission, confirmation, and/or other authorization has been described, one of skill in the art in possession of the present disclosure will apricate how open-ended/non-temporary credential reset authorizations will fall within the scope of the present disclosure as well.

With reference to FIG. 7B, in an embodiment of block 510 and in response to receiving the temporary credential reset authorization 722, the credential information reset engine 304 in the networking device 204a/300 may perform a login and credential change 724 that may include automatically logging in to the operating system of the networking device 204a and beginning a credential change process for the user of the user device 601. As will be appreciated by one of skill in the art in possession of the present disclosure, the credential information reset authorization engine 404 in the administrator-selected credential information reset authorization device 206a may have access to credential information that allows it to login to its operating system, access an account or other information associated with the user of the user device 601, invalidate the credential information for the user of the user device 601 that is being reset, and begin a credential information reset process with the user of the user device 602, discussed in further detail below. However, while a specific technique for beginning a credential information reset process for the user of the user device 601 has been described, one of skill in the art in possession of the present disclosure will appreciate how other credential information reset processes will fall within the scope of the present disclosure as well.

With reference to FIGS. 7B and 8H, in an embodiment of block 510 and following the temporary credential reset authorization 722, networking device 204a and the user device 601 may perform credential information reset operations 814. For example, the credential information reset process discussed above may include the credential information reset engine 304 in the networking device 204a/300 providing, for display on the user device 601, a credential information reset screen that may be provided via a GUI, a CLI, and/or using other techniques that would be apparent to one of skill in the art in possession of the present disclosure. In response to having the credential information reset screen displayed on the user device 601, the user of the user device 601 may provide a credential change 726, which may include the user of the user device 601 providing a new username and/or password, a new biometric scan such as a fingerprint scan or a facial scan, and/or any other credential information that would be apparent to one of skill in the art in possession of the present disclosure.

In an embodiment, as part of credential information reset operations 814 and in response to receiving the credential change 726, the credential information reset engine 304 in the networking device 204a may validate the new credential information (e.g., to ensure it satisfies credential information requirements) and, in response, transmit a credential change success 728 to the user device 601. For example, the credential information reset engine 304 in the networking device 204a may generate a notification on the credential information reset screen, an email, a text message, a pop-up message, and/or any other notification or alert that is configured for display on the user device 601 in order to notify the user of the credential change success 728. However, while a particular technique for informing a user of a credential change success has been described, one of skill in the art in possession of the present disclosure will appreciate how any techniques to alert a user to the successful credential information change for a networking device may be utilized while remaining within the scope of the present disclosure as well. In an embodiment, as part of credential information reset operations 814 and following the transmission of the credential change success 728, the user device 601 may provide a user login 730 to the networking device 204a in order to login to the networking device 601 using their new credential information. For example, the user of user device 601 may utilize their new username and password, their new biometric scan, and/or any other new credential information to login to networking device 204a, and one of skill in the art in possession of the present disclosure will appreciate that the user may then access the networking device 204a once that new credential information has been validated by the networking device 204a.

Thus, systems and methods have been described that provide for the resetting of credential information for a networking device via a credential information reset authorization device that is accessible to an administrator. For example, the networking device credential information reset system of the present disclosure may include credential information reset authorization devices coupled to a networking device. At least one of the credential information reset authorization devices receives a networking device credential information reset request from the networking device and, in response, generates a networking device credential information reset alert and provides it for display on an administrator device. Following the networking device credential information reset alert being provided for display on the administrator device, a first credential information reset authorization device receives first credential information for the first credential information reset authorization device from the administrator device, validates the first credential information and, in response, provides a credential information reset authorization to the networking device that is configured to cause the networking device to reset second credential information for the networking device. As will be appreciated by one of skill in the art in possession of the present disclosure, the systems and methods described herein operate to provide for the resetting of credential information for a networking device without network downtime or configuration loss, and may be particularly beneficial in situations where the networking device does not include Internet connectivity and/or the administrator does not have easy access to all of the networking devices/credential information reset authorization devices in a datacenter.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device credential information reset system, comprising:
a first networking device; and
a plurality of credential information reset authorization devices that are each coupled to the first networking device, wherein at least one of the plurality of credential information reset authorization devices is configured to:
receive, from the first networking device, a networking device credential information reset request;
generate, in response to receiving the networking device credential information reset request, a networking device credential information reset alert; and provide, for display on an administrator device, the networking device credential information reset alert, wherein a first credential information reset authorization device that is included in the plurality of credential information reset authorization devices is configured, following the networking device credential information reset alert being provided for display on the administrator device, to:
receive, from the administrator device, first credential information for the first credential information reset authorization device;
validate the first credential information; and
provide, in response to validating the first credential information, a credential information reset authorization to the first networking device that is configured to cause the first networking device to reset second credential information for the first networking device.

2. The system of claim 1, wherein the first networking device does not include a connection to the Internet.

3. The system of claim 1, wherein each of the plurality of credential information reset authorization devices is provided by a respective second networking device that is separate from the first networking device.

4. The system of claim 1, wherein the second credential information includes a user password.

5. The system of claim 1, wherein the at least one of the plurality of credential information reset authorization devices is configured to:
generate, in response to receiving the networking device credential information reset request, an entry in a system log that identifies the first networking device and the networking device credential information reset request.

6. The system of claim 1, wherein the first credential information includes an administrator password.

7. The system of claim 1, wherein the at least one of the plurality of credential information reset authorization devices is configured to:
validate, in response to receiving the networking device credential information reset request, the first networking device, wherein the generation and provisioning of the networking device credential information reset alert is performed in response to validating the first networking device.

8. An Information Handling System (IHS), comprising:
a processing system; and
a memory system that is coupled to the processing system and that includes instructions that, when executed by the processing system, cause the processing system to provide a credential information reset authorization engine that is configured to:
receive, from a first networking device, a networking device credential information reset request;
generate, in response to receiving the networking device credential information reset request, a networking device credential information reset alert;
provide, for display on an administrator device, the networking device credential information reset alert;
receive, from the administrator device following the networking device credential information reset alert being provided for display on the administrator device, first credential information for the first credential information reset authorization device;
validate the first credential information; and
provide, in response to validating the first credential information, a credential information reset authorization to the first networking device that is configured to cause the first networking device to reset second credential information for the first networking device.

9. The IHS of claim 8, wherein the first networking device does not include a connection to the Internet.

10. The IHS of claim 8, wherein the processing system and the memory system are included in a second networking device that is separate from the first networking device.

11. The IHS of claim 8, wherein the second credential information includes a user password.

12. The IHS of claim 8, wherein the credential information reset authorization engine is configured to:
generate, in response to receiving the networking device credential information reset request, an entry in a system log that identifies the first networking device and the networking device credential information reset request.

13. The IHS of claim 8, wherein the first credential information includes an administrator password.

14. A method for resetting credential information for a networking device, comprising:
receiving, by at least one credential information reset authorization device from a first networking device, a networking device credential information reset request;
generating, by the at least one credential information reset authorization device in response to receiving the networking device credential information reset request, a networking device credential information reset alert;
providing, by the at least one credential information reset authorization device for display on an administrator device, the networking device credential information reset alert;
receiving, by a first credential information reset authorization device that is included in the at least one credential information reset authorization device from the administrator device following the networking device credential information reset alert being provided for display on the administrator device, first credential information for the first credential information reset authorization device;
validating, by the first credential information reset authorization device, the first credential information; and
providing, by the first credential information reset authorization device in response to validating the first credential information, a credential information reset authorization to the first networking device that is configured to cause the first networking device to reset second credential information for the first networking device.

15. The method of claim 14, wherein the first networking device does not include a connection to the Internet.

16. The method of claim 14, wherein each of the at least one credential information reset authorization device is provided by a respective second networking device that is separate from the first networking device.

17. The method of claim 14, wherein the second credential information includes a user password.

18. The method of claim 14, further comprising:
generating, by the at least one credential information reset authorization device in response to receiving the networking device credential information reset request, an entry in a system log that identifies the first networking device and the networking device credential information reset request.

19. The method of claim 14, wherein the first credential information includes an administrator password.

20. The method of claim 14, further comprising:
validating, by the at least one credential information reset authorization device in response to receiving the networking device credential information reset request, the first networking device, wherein the generation and provisioning of the networking device credential information reset alert is performed in response to validating the first networking device.

\* \* \* \* \*